May 25, 1943.  A. G. RINDFLEISCH  2,320,195
AIRPLANE PROPELLER AND ACTUATING MECHANISM THEREFOR
Filed Feb. 27, 1940  10 Sheets-Sheet 1

INVENTOR
Arthur G. Rindfleisch

INVENTOR
Arthur G. Rindfleisch
by his attorneys
Stevens, Blenko & Parmelee

May 25, 1943. A. G. RINDFLEISCH 2,320,195
AIRPLANE PROPELLER AND ACTUATING MECHANISM THEREFOR
Filed Feb. 27, 1940 10 Sheets-Sheet 4
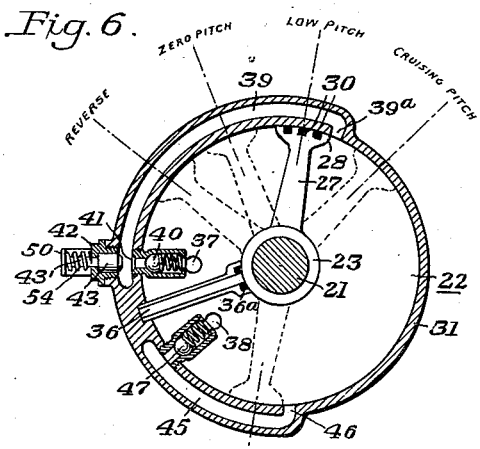
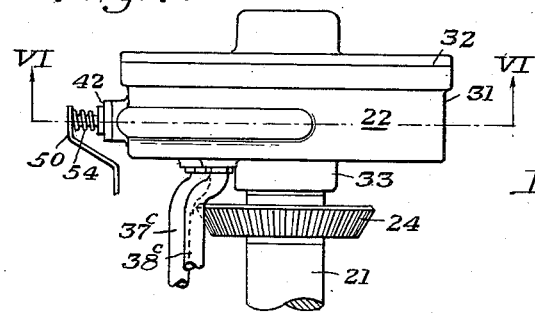
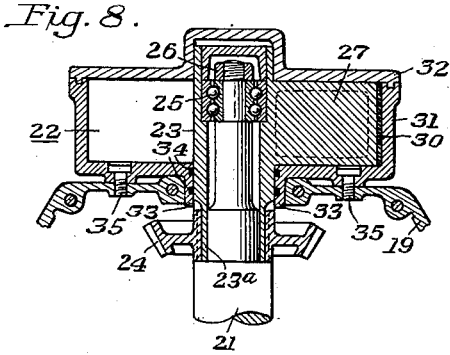
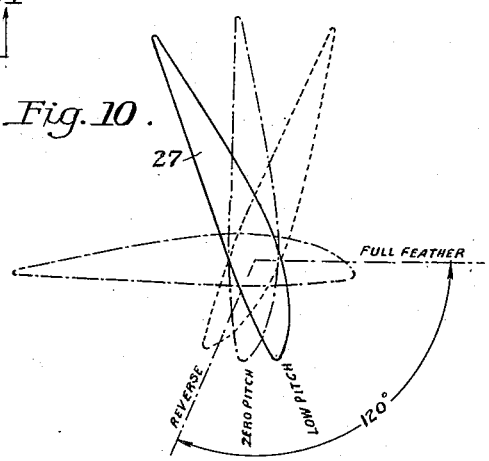
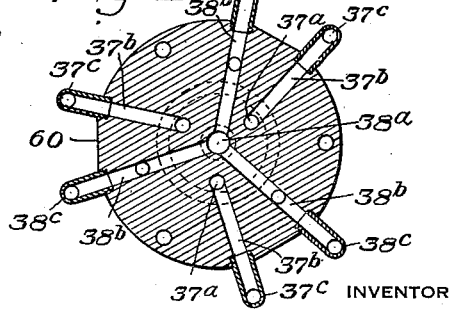
INVENTOR
Arthur G. Rindfleisch
by his attorneys
Stebbins, Blenko & Parmelee

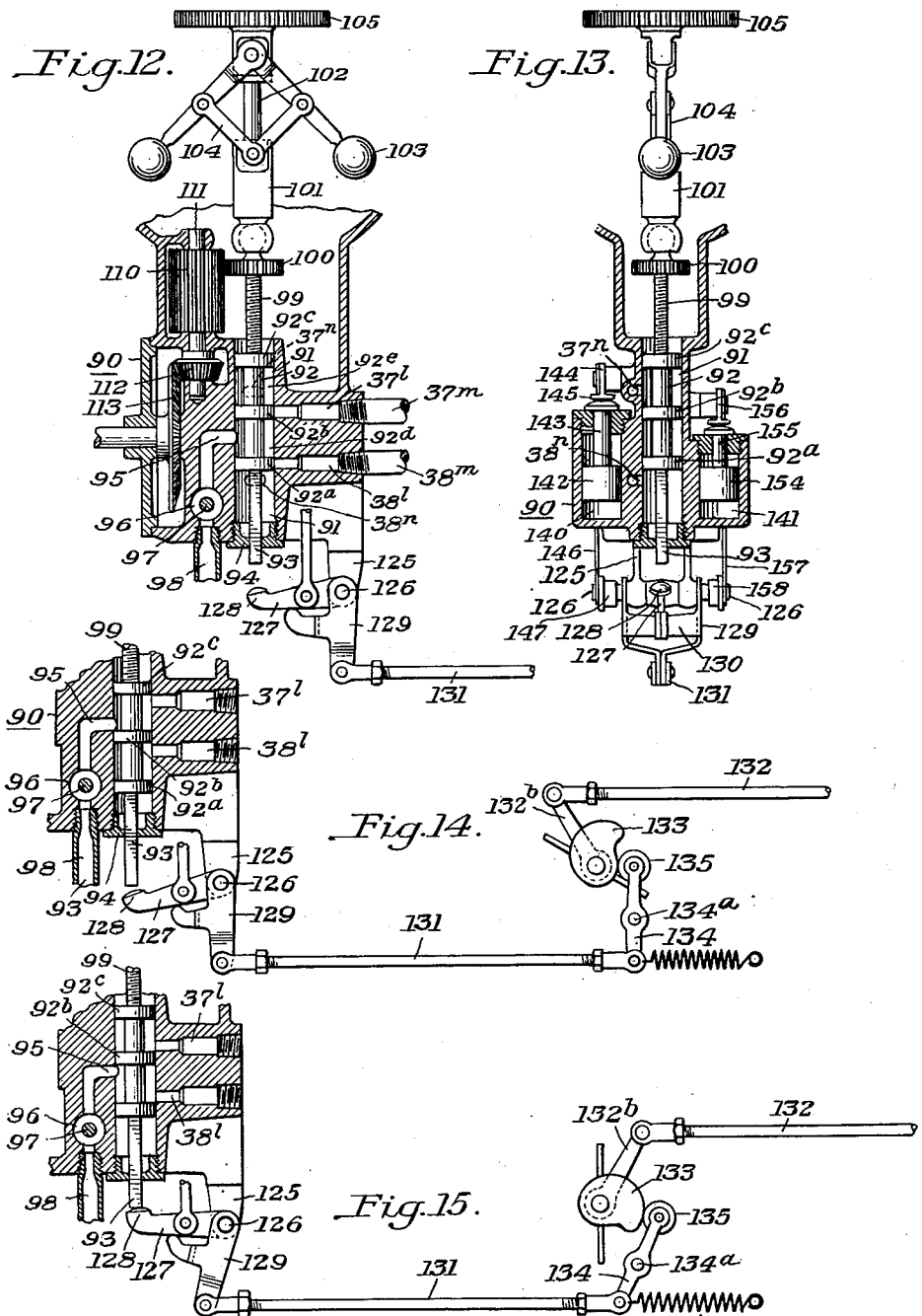

May 25, 1943.  A. G. RINDFLEISCH  2,320,195
AIRPLANE PROPELLER AND ACTUATING MECHANISM THEREFOR
Filed Feb. 27, 1940  10 Sheets-Sheet 6
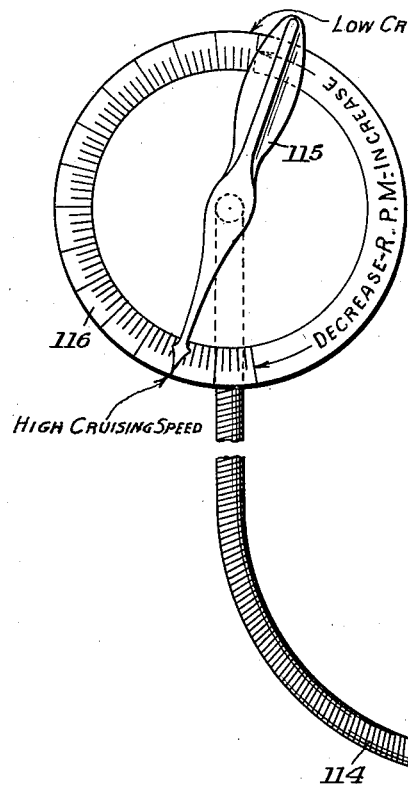
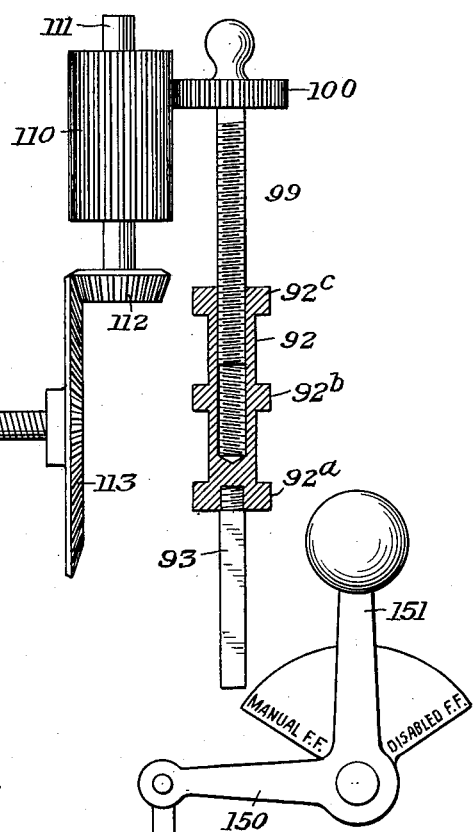
Fig.16.
Fig.17.
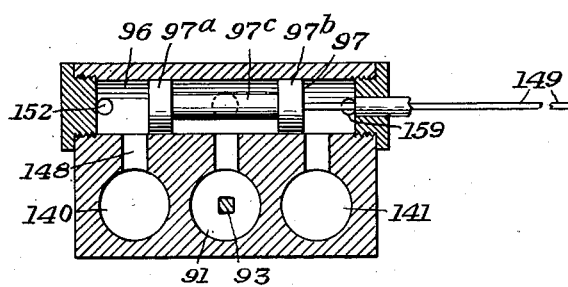
INVENTOR
Arthur G. Rindfleisch
by his attorneys

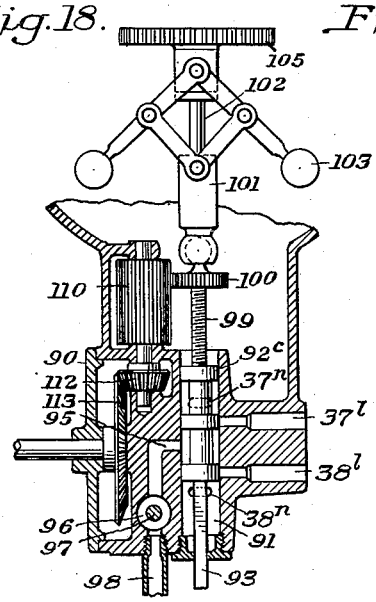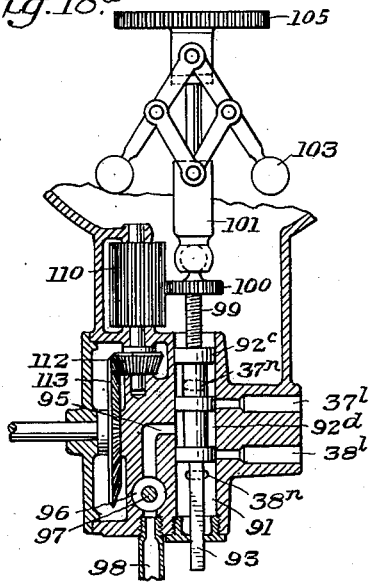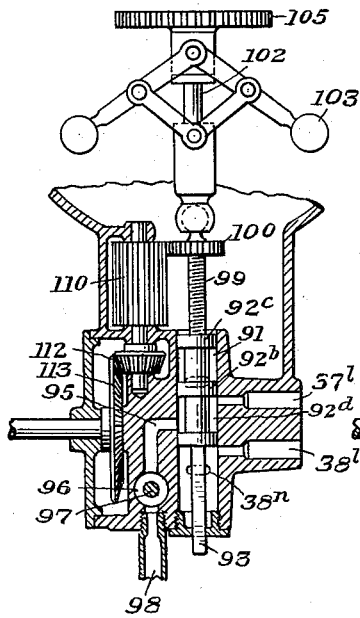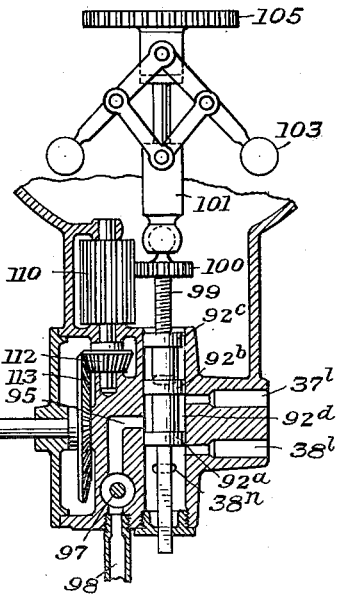

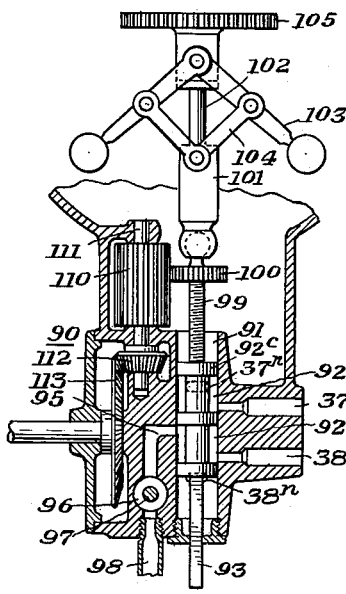
Fig. 20.
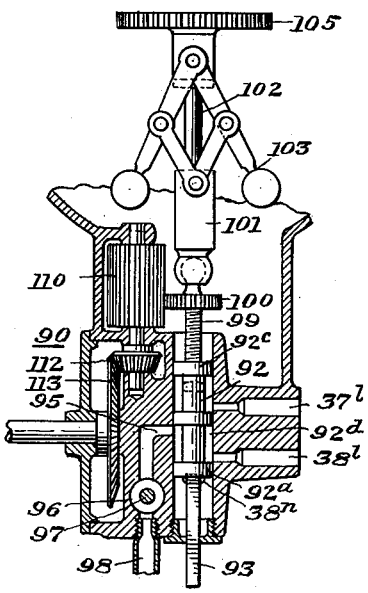
Fig. 20ᵃ.
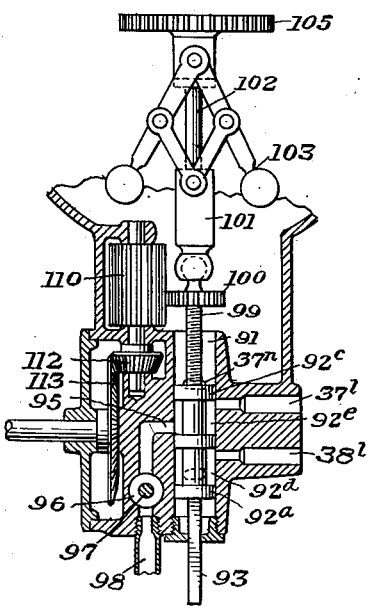
Fig. 21.
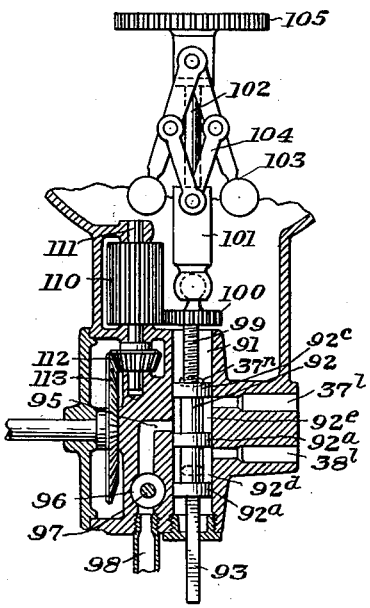
Fig. 21ᵃ.

May 25, 1943.  A. G. RINDFLEISCH  2,320,195
AIRPLANE PROPELLER AND ACTUATING MECHANISM THEREFOR
Filed Feb. 27, 1940  10 Sheets-Sheet 9
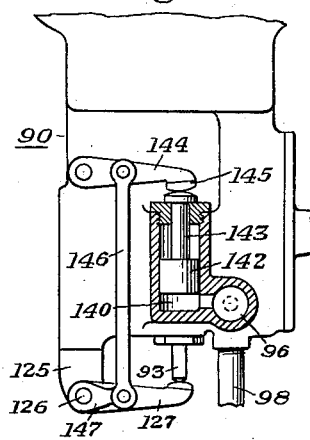
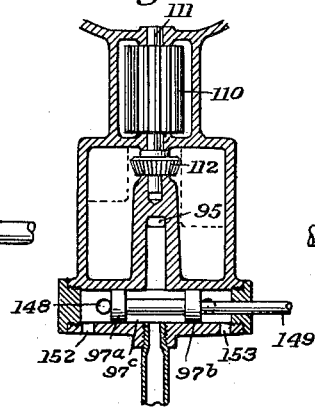
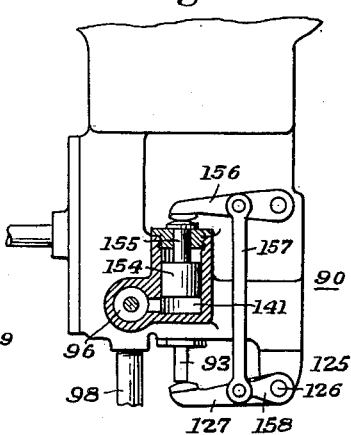
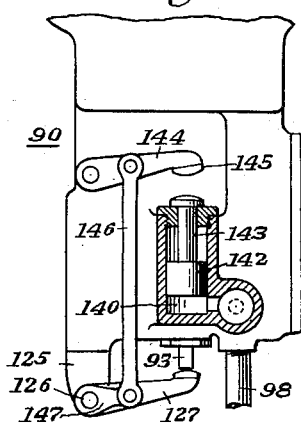
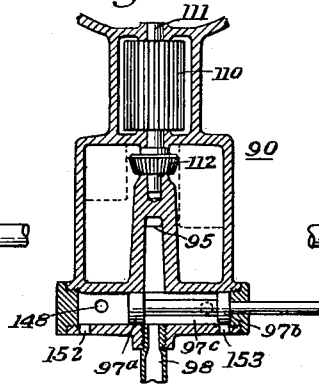
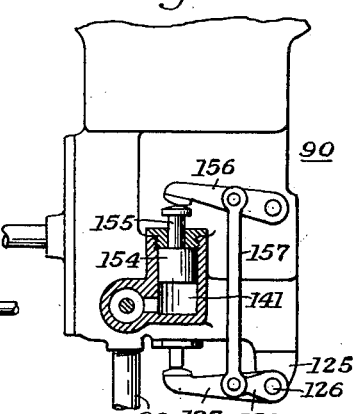
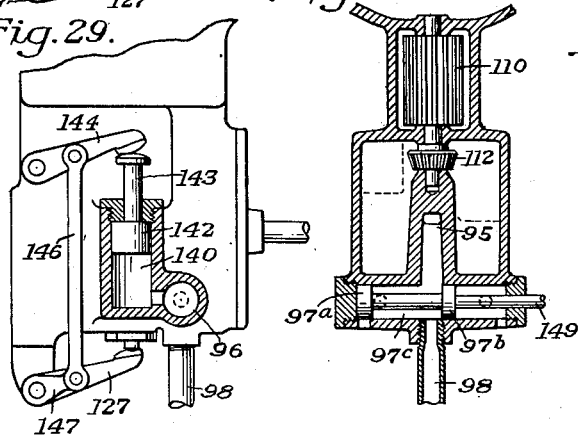
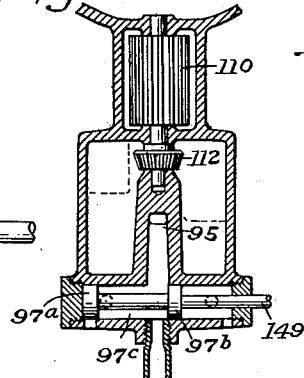
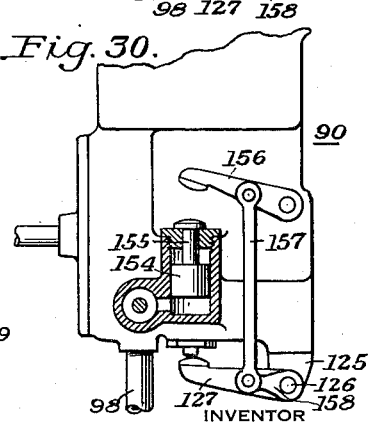
INVENTOR
Arthur G. Rindfleisch
by his attorneys May 25, 1943.  A. G. RINDFLEISCH  2,320,195
AIRPLANE PROPELLER AND ACTUATING MECHANISM THEREFOR
Filed Feb. 27, 1940   10 Sheets-Sheet 10
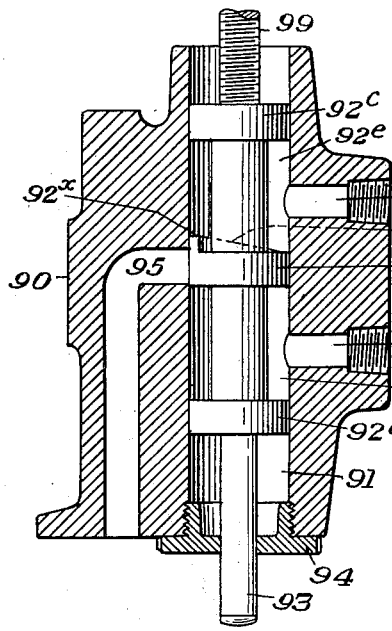
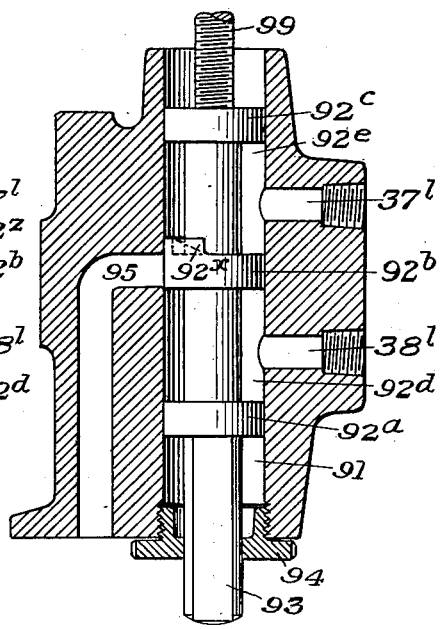
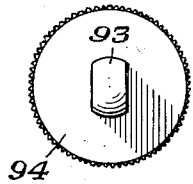
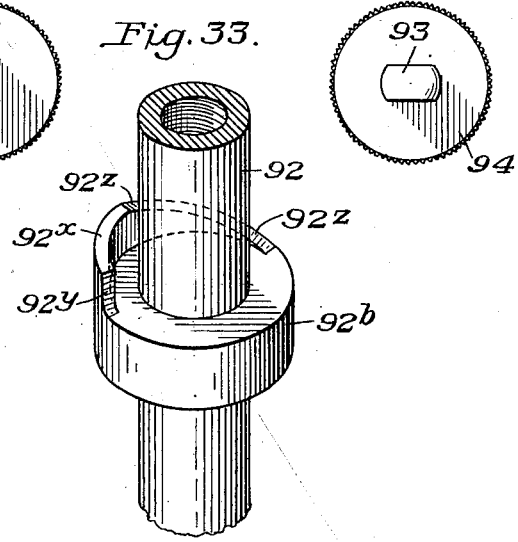
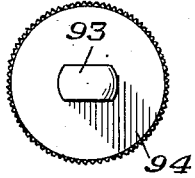
INVENTOR
Arthur G. Rindfleisch
by his attorneys Patented May 25, 1943

2,320,195

UNITED STATES PATENT OFFICE 2,320,195

AIRPLANE PROPELLER AND ACTUATING MECHANISM THEREFOR

Arthur G. Rindfleisch, Chicago, Ill., assignor to Bocjl Corporation, Pittsburgh, Pa., a corporation of Delaware Application February 27, 1940, Serial No. 321,026

33 Claims. (Cl. 170—135.6)

This invention relates to airplane propellers of the variable pitch, full-feathering type and to a control mechanism therefor.

It is common practice at the present time in the art of airplane propellers to have the blades angularly adjustable whereby the pitch may be varied as flight conditions are changed. One important advantage of this is the ability of the propeller, by changing the pitch of its blades, to maintain the engine at a predetermined constant speed. For example, if an engine develops its power most efficiently at a speed of 2500 R. P. M., an automatic variable pitch propeller enables the engine to be maintained at this constant speed. If the ship goes into a climb imposing a greater load on the engine and therefore tending to slow it down, the variable pitch mechanism causes the pitch angle of the blades to decrease so that the H. P. output can be maintained under the increased load, and therefore the speed of the engine is kept constant. On the other hand, if the plane goes into a long glide, the work performed by the engine is less and the pitch angle of the blades is increased.

It is also desirable with variable pitch propellers to enable the blades of the propeller to be full-feathered. In this position the edges of the blades are turned in the direction of travel of the ship and the propeller offers a minimum wind resistance to the forward motion of the plane. When the blade is full-feathered it will not "windmill," and full-feathering is therefore desirable when an engine is disabled both to prevent the disabled engine from turning over and also to lower the resistance to the forward movement of the plane when the propeller is not being driven. Full-feathering of the blades is important in multi-motored planes where it is desired to reduce to a minimum the load on the remaining motor or motors after one motor goes dead, and it is of course desirable in single-motored planes in that if the motor goes dead, the ship may glide further before landing than where the propeller cannot be feathered. Most variable pitch propellers are therefore provided at the present time with manual means for turning the blades to a full-feathered position.

In my copending application Serial No. 60,949 of which this application is a continuation-in-part, there is disclosed a variable pitch full-feathering propeller with automatic means for full-feathering the blades when the engine speed drops below a predetermined minimum. Automatic full-feathering is of special value in the event of a motor failure at the time of take-off.

For example, in present four-motored planes, there have to be four individual controls for manually full-feathering the several propellers. If a motor fails on the take-off, the pilot needs to devote all of his attention to maneuvering the ship, and there is always the possibility that in any such sudden emergency the operator might not immediately determine which of the four engines had failed or he might inadvertently select the wrong control from the group of four. This would be an added calamity because the ship would then be deprived of the power from two engines instead of one.

While automatic full-feathering is therefore definitely advantageous, and while automatic full-feathering is disclosed in my copending application above referred to, the propeller disclosed in the said application lacks certain features of flexibility which are desirable. For example, after a propeller as disclosed in my said copending application is full-feathered, it cannot be restored to a driving pitch position while the plane remains in flight. It cannot be tested in ground maneuvering before the plane takes off, and the ratio between cruising speed and full-feathering speed cannot be adjusted for different flight regimes. For example, a military plane may require a maximum constant engine speed of 2500 r. p. m. for high cruising speed, but for purposes of economy or for other reasons it may be desirable to cruise at a low constant speed say for example, 1800 R. P. M. The speed at which the propeller will windmill varies of course according to the speed of the plane, and the windmilling speed is lower than the constant speed at which the engine is normally driven. For example, where the cruising speed is at a constant of 1800 R. P. M., the propeller might windmill, i. e., be rotated by the force of the wind as the plane moves through the air, at a speed of perhaps 1400 R. P. M. Automatic full-feathering must occur when the propeller speed drops below the constant cruising speed and above the highest windmilling speed. The windmilling speed is always lower than the speed at which the propeller is driven by the engine but of course as the speed of the plane increases, the maximum windmilling speed also increases. Referring to the above example, where the plane has a low cruising range at 1800 R. P. M., the maximum windmilling speed might perhaps be 1400 R. P. M. whereas in the high cruising range where the propeller is being driven at 2500 R. P. M., the windmilling speed might for example be in the neighborhood of 2100 or 2200 R. P. M., the windmilling speed at the higher cruising range being faster than the driving speed in the lower cruising range. Since the propeller should automatically full-feather in order to prevent windmilling of the propeller before the propeller drops down to the windmilling speed, the automatic full-feathering in the above example in one case must occur at a propeller speed higher than the driving speed in the other case. One of the purposes of the present invention is to provide flexibility in the mechanism to enable the full-feathering speed of the propeller to be immediately changed up or down as the constant speed for the flight is changed up or down. In this respect the invention provides an important improvement over the invention disclosed in my said prior application and overcomes one objection that has heretofore been raised to the use of automatic full-feathering on airplane propellers.

Another objection to automatic full-feathering as heretofore provided has been that it occurs whenever the engine speed drops below the constant cruising speed and above the maximum windmilling speed, whereas for maneuvering the plane on the ground and for taxiing over the surface, it is often necessary to drive one or more of the engines at a speed below the maximum windmilling speed. According to the present invention there is provided a mechanism wherein automatic full-feathering can take place only when the throttle has been advanced to a point where the engine is operating at a flying speed. By reason of this improvement, the engine may be operated at a low speed at any time without full-feathering of the propeller blades occurring, but just as soon as the throttle is advanced to a position for taking off or flying, the automatic full-feathering control becomes effective. This change-over from a condition where the full-feathering mechanism is inoperative to a position where it is operative takes place automatically with the movement of the throttle and requires no conscious effort on the part of the pilot. The same flexibility enables the blades to be unfeathered at any time the pilot desires to restore the blades to an operating position. This is desirable among other conditions when the plane is coming out of a glide and it is desired to use the windmilling of the propeller to crank the engine to start it.

As an additional feature, the preferred embodiment of the invention contemplates that the pitch of the blades may be reversed at the will of the operator. Reversing of the pitch of the blades may be desired in maneuvering the plane on the ground or for other purposes, and as a safety provision this reversing mechanism may be rendered effective to change to a reversed pitch position only when the engine is operating at low speed so that it becomes impossible for an operator to inadvertently reverse the pitch of the blades while the engine is driving the propeller at a normal flying speed.

In addition to providing automatic full-feathering, my invention contemplates that the automatic full-feathering mechanism may be rendered completely inoperative and that manual full-feathering may be accomplished should it be desirable for any purpose to temporarily eliminate automatic full-feathering of the blades.

My invention also provides a novel construction for variable pitch full-feathering propellers useful for either automatic or manual control of an improved and efficient construction and less complicated than the present types of variable pitch propeller mechanisms now available, and the feature of automatic full-feathering provided by the invention is incorporated with practically no increase in the weight either of the propeller or the installation as a whole and with practically no change of the parts that are required for normal variable pitch constant speed operation.

My invention may be understood by reference to the accompanying drawings which illustrate a present preferred embodiment thereof and in which Figure 1 is a schematic view of the various units comprising the propeller and control;

Figure 6 is a section through one of the three similar blade-rotating motors mounted on the hub, the view being substantially in the plane of line VI—VI of Figure 7;

Figure 7 is a side elevation of one of these motors detached from the hub;

Figure 8 is a transverse section through the unit shown in Figure 7;

Figure 9 is a perspective view of the movable vane forming a part of the motor shown in Figures 6, 7 and 8, this view being on a larger scale than the preceding three views;

Figure 10 is a diagram showing the range of movement of the propeller blades from the full-feather position to a reverse position, the contour of the blades being outlined in full lines for the low pitch position and being outlined in dotted lines in various other positions;

Figure 11 is a sectional view through the distributing plate at the front of the hub assembly through which fluid pressure is communicated from the propeller shaft to the several fluid pressure motors, the view being substantially in the plane of line XI—XI of Figure 3;

Figure 12 is a transverse section through the selecting unit;

Figure 13 is a similar transverse vertical section at right angles to Figure 12;

Figure 14 is a view showing a portion only of the selector, together with mechanism through which the selector is coupled to the engine throttle to prevent automatic full-feathering in ground maneuvering, the parts being shown in a position which they assume when the throttle is advanced to a flying speed;

Figure 15 is a similar view showing the parts in the position which they occupy for maneuvering at ground speed of the engine;

Figure 16 is a somewhat schematic view, the view illustrating the ratio-changing control through which the speed at which automatic full-feathering of the propeller may be varied;

Figure 17 is also a somewhat schematic view showing a portion of the selector unit in horizontal section and showing the control lever through which the parts are moved for rendering the automatic full-feathering inoperative or for effecting manual full-feathering;

Figures 18, 19, 20 and 21 are like views representing a longitudinal section through the selector unit at different engine speeds and with the parts adjusted for automatic full-feathering upon a predetermined drop in the engine speed when the ratio-adjusting mechanism is set in the high cruising range, the views being vertical sections through the selector unit and with some parts of the selector omitted, Figure 18 showing the position which prevails when the engine is operating at constant speed in the selected cruising range, Figure 19 showing the position of the parts when the engine speeds above the selected cruising speed, Figure 20 showing the position of the parts when the engine speed drops below the selected cruising speed, and Figure 21 showing the position of the parts when the engine speed has dropped to a point to call for automatic full-feathering;

Figures 18A, 19A, 20A and 21A are views corresponding to Figures 18 to 21 inclusive showing the corresponding position of the parts when the speed setting is for a low cruising speed;

Figure 22 represents a vertical section through a portion of the control unit showing the control valve in a normal position where the automatic full-feathering of the propeller will be effective upon a predetermined drop in engine speed;

Figure 23 is a similar view showing the valve shifted to render the automatic full-feathering disabled;

Figure 24 is a similar view showing the valve in a position to effect manual full-feathering;

Figure 25 shows the manual full-feathering control in the position which it assumes when the valve is in the position shown in Figure 22;

Figure 26 is a view of the disabling control by means of which automatic full-feathering is prevented when the control valve is in the position shown in Figure 22;

Figure 27 is a view similar to Figure 25 of the control valve setting shown in Figure 23;

Figure 28 is a view similar to Figure 26 for the control valve setting shown in Figure 23;

Figure 29 is a view similar to Figure 25 for the control valve setting shown in Figure 24; and Figure 30 is a view similar to Firgure 26 for the control valve setting shown in Figure 24;

Figure 31 is a view through a part of the selector valve, showing a slightly modified construction, only a portion of the entire selector valve being shown, the view being a longitudinal section through the valve body with the valve element shown in elevation;

Figure 32 is a view similar to Figure 31 but showing the valve element rotated 90° from the position shown in Figure 31;

Figure 33 is a perspective view of the top of one of the disks of the valve shown in Figures 31 and 32;

Figure 34 is a partial bottom plan view of this modification with the valve in the position shown in Figure 31; and Figure 35 is a similar view of Figure 32.

*Propeller—General structure and blade mounting*

Figure 2:
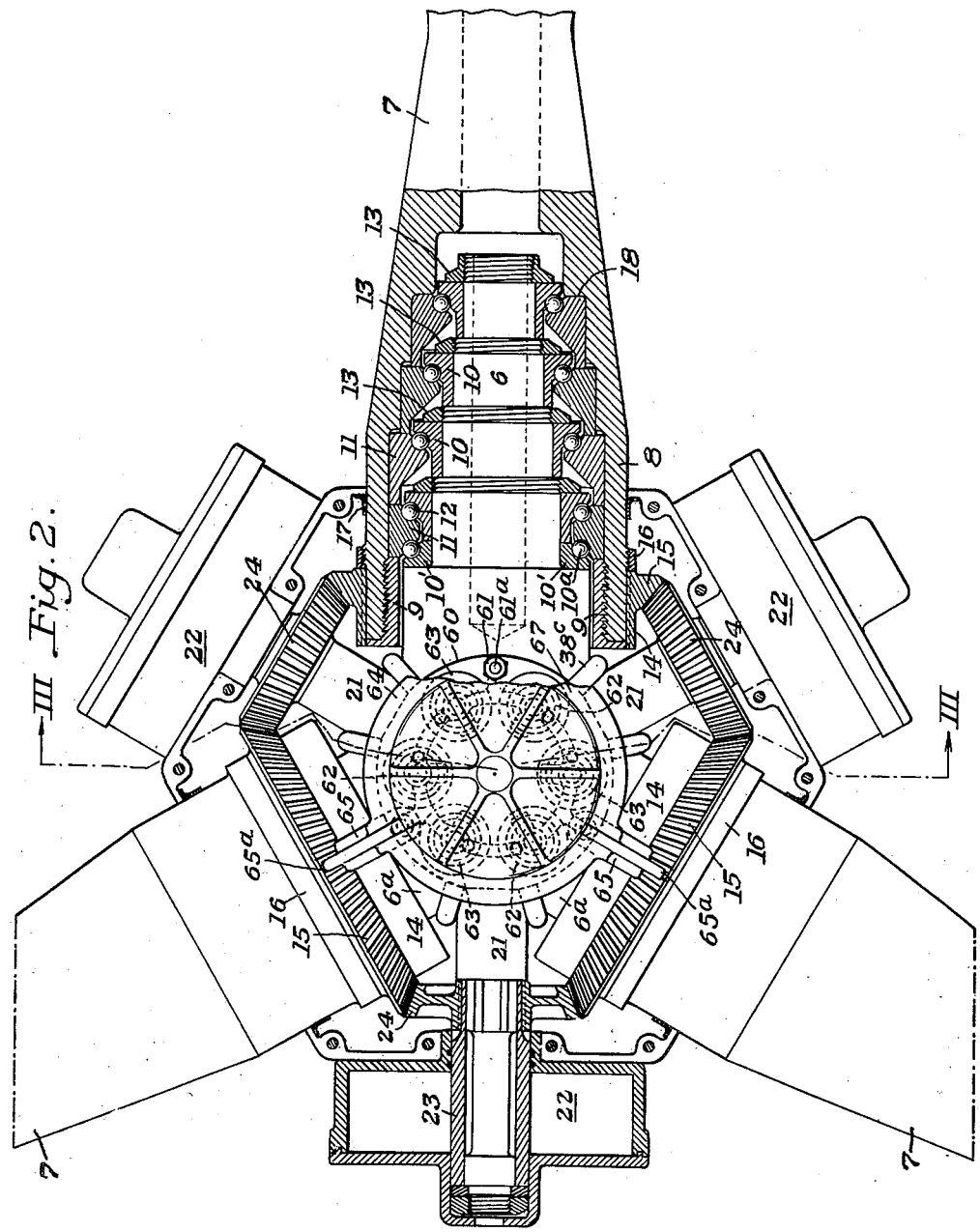
Figure 2 is a front elevation partly in section of the propeller and hub assembly.
Figure 3:
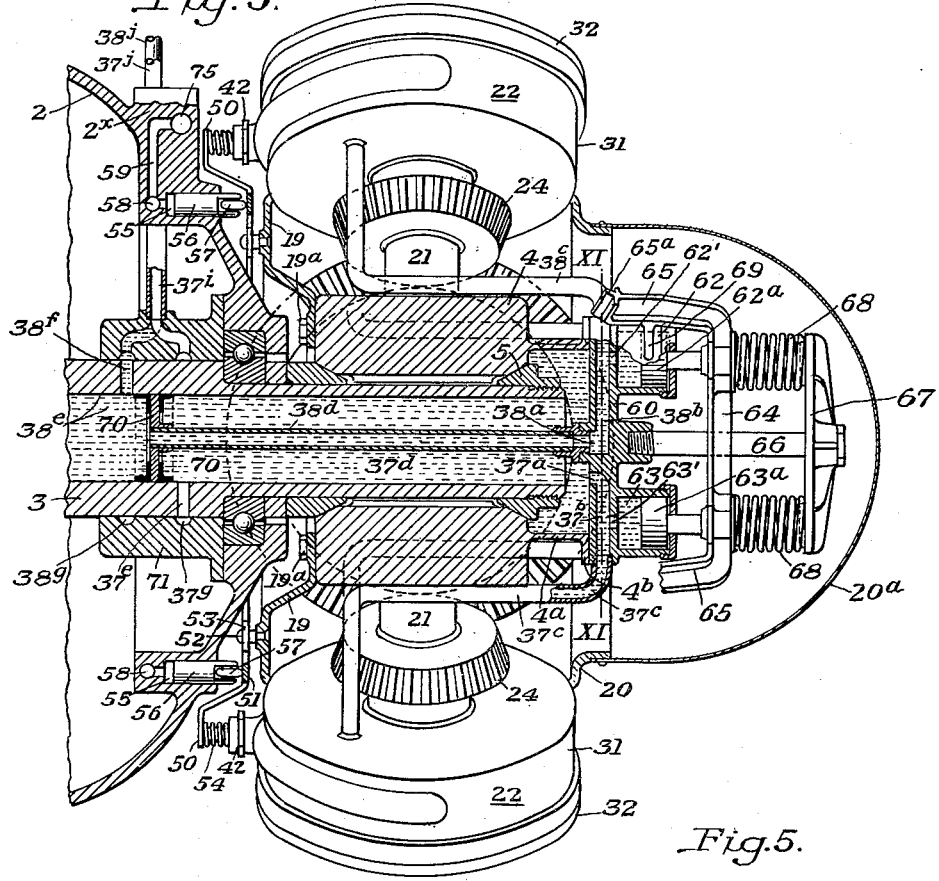
Figure 3 is a longitudinal vertical section through the hub and the adjacent portion of the crankcase of the engine, the view being substantially in the plane of line III—III of Figure 2.

Referring first to Figures 2 and 3 in particular, these views disclose the general construction of the propeller hub and associated parts. In these figures 2 designates the end of the crank-case of the internal combustion engine for driving the propeller, and 3 designates the forward end of the crank-shaft, the end of the crank-shaft being hollow. The hub comprises a drop-forged spider designated generally as 4 and which has a central longitudinal bore through which the outer end of the shaft 3 extends. The hub is retained on the outer end of the shaft by a tapered nut 5, which also prevents leakage of the fluid which rotates the blade-turning motors from around the hub.

The hub 4 is illustrated as having three principal radially extending studs or trunnions designated generally as 6. There are three propeller blades 7 illustrated, there being one blade on each trunnion. There is a large ring nut or externally threaded collar 9 fitted about the base portion 6a of each trunnion. The extreme end portion of the blade is screwed over this hollow ring nut and the two parts are keyed together. On each step of the trunnion there is a raceway 10 and the interior of the hub is provided with cooperating raceways 11 and ballbearings 12 are interposed between the raceways 10 and 11 of each step. The raceways 10 are individually retained on the hub by ring nuts 13. Surrounding the base of each blade and keyed thereto is a sleeve 14 on which is a pinion 15. A collar 16 is threaded onto the base portion of the blade outwardly from the sleeve 14.

In assembling the propeller, the ring nut 9 is first placed over the end portion 6a of the trunnion. A raceway 10' is then placed on the innermost step of the trunnion, a row of balls 10a is placed on this raceway and then the first outer raceway 11 is slipped onto the assembly after which the first series of ballbearings 12 are put in place and the raceway 12 is then slipped into the assembly and the first ring nut 13 is then screwed onto the threaded portion of the trunnion provided to receive it. It is adjusted to secure the proper freedom of movement in the ballbearing assembly without excess play. Then the second outer raceway member 11 is slipped into place, the next series of balls 12 inserted, and the next inner raceway element is applied to the second step of the trunnion outwardly from the base and then the second nut 13 is screwed into place. After the bearing construction has been built up in this fashion and the outermost nut 13 has been screwed into position, the inner end portion of the blade is set over the assembly and is screwed down onto the ring nut 9. Previous to the blade being thus placed in position on the trunnion, the sleeve 14 with its gear 15 is secured to the base of the blade and the collar 16 is also secured to the blade before the blade is assembled on the trunnion. Also, an oil sealing ring 17 is placed about the base of the blade above the collar 16. The ring nut 9 is screwed into the base 8 of the blade until the shoulder 18 of the propeller abuts against the outermost raceway 11, and the outer end of the ring nut contacts the innermost raceway 11 thus confining the blade against endwise movement on the trunnion. When the parts are adjusted to this position, the ring nut is keyed to the end of the hub, the key not being shown.

Due to the fact that the trunnion is provided with several steps of outwardly smaller diameter and there is an individual raceway and locking nut for each step, each of the ring nuts 13, where there are four steps, resists 25% of the total centrifugal load of the blade. The load of the blades is thus distributed along the trunnion and is distributed among several bearings and is distributed to several different nuts so that it is not concentrated in any one bearing or at any one place on the trunnion. The matter of securing the blades to the trunnions provides a strong but relatively simple mounting for the blades on the hub in such manner that the blades can be adjusted about their own longitudinal axis to vary the pitch of the propeller.

A still further advantage in my propeller over conventional propeller construction arises from the fact that the end of the blade fits over the trunnion on the hub whereas in the conventional propeller the blade is received within a socket in the hub. Among other advantages, this external mounting of the blade gives ready access to the blade mounting and to the adjusting collar 16 at the top of the gear 15 so that if play develops due to wear, this wear can be taken up by merely turning the collar 16 down.

There is a gear casing carried by the hub, this casing comprising an inner section 19 (see Figure 3) which is bolted to the rear end of the hub by bolts 19a and there is a front section 20 (see Figure 3) which is bolted to the inner section 19 and which carries a dome-shaped sheet metal shell 20a forming the nose of the propeller and hub assembly. In assembling the propeller the gear casing 19 is secured to the hub before the hub is mounted on the propeller shaft while the front section 20 is bolted to the rear section after the assembly has been otherwise completed.

Propeller—Blade rotating mechanism

Formed on the hub spider 4 intermediate the main trunnions 6 are secondary trunnions or studs 21, these being alternated between the trunnions 6 and being also radial to the hub. Each one of the studs 21 carries a fluid pressure motor for rotating the propeller blades. These motors are all of like construction and like reference numerals have been used to describe all three of them. The general location of these motors, which are designated generally as 22, is most clearly shown in Figures 2 and 3, while the detailed construction of the motors is shown in Figures 6 to 9.

The end of each of the studs 21 is reduced in section as shown in Figure 8 to provide a spindle on which is rotatably mounted a combined sleeve and vane member shown in detail in Figure 9. This member has a sleeve 23 which fits over the outer end of the stud 21. The lower end 23a of this sleeve is splined to key into a pinion 24. As best shown in Figure 2, the pinions 24 of the several motors are disposed between and mesh with the pinions 15 on the propeller blades, each pinion 24 meshing with two of the pinions 15 and each of the pinions 15 of course meshing with two of the pinions 24. The pinions 24 are half the diameter of the pinions 15 so that two degrees of rotation of the pinions 24 is necessary to rotate the gears 15 through one degree.

Within the outer end of the sleeve 23 is a bearing 25, and a nut 26 at the end of the stud 21 is screwed down against this bearing to hold the sleeve on the stud and to hold the sleeve against centrifugal force. The sleeve 23 is provided with a radially extending vane 27, the outer end of which is widened out as indicated at 28 and which may be provided with a number of vertically extending grooves 29 in its outer face, the outer face being arcuately curved concentrically with the sleeve. These grooves 29 may be oil grooves or they may contain packing strips 30 as shown in Figure 6.

The sleeve 23 projects up into and the vane 27 is received in a cylindrical casing 31. The casing 31 has a removable cover plate 32 which is sealed to the outer end thereof and which is held in place by bolts, not shown. The casing 31 has a hub portion 33 at the center of the bottom thereof which fits about the sleeve 23 and there are packing rings 34 inside the hub 33 and about the sleeve 23. As shown in Figure 8, the vane 27 is of a width equal to the distance between the top plate 32 and the bottom of the cylindrical chamber formed in the casing 31 and the vane is of a length so that the curved outer face thereof slides against the inner peripheral wall of the casing 31. This is best shown in Figures 6 and 8. The casing 31 is removably secured to the gear housing 19—20 by bolts 35.

It will thus be seen that each motor comprises a casing having a cylindrical chamber with a sleeve at the center thereof, the sleeve having a vane that forms a radial partition in the chamber and that movement of this vane around the interior of the chamber transmits motion to the pinion 24. The pinion 24 in turn rotates the two adjacent blades through engagement of the pinion 24 with the pinions 15 of the adjacent propeller blades.

In order that differential fluid pressures may be established on opposite sides of the vane to drive it in one direction or the other, the interior of the casing is provided with a stationary radial partition or cylinder head 36 (see Figure 6). The outer end of this partition is received in a recess in the wall of the casing 31 while the inner end of this partition is curved to bear against the sleeve 23 and it is provided with sealing strips 36a. Opening into the casing through the bottom thereof at a point closely adjacent to one side of the stationary partition 36 is a port 37. Opening into the casing through the bottom thereof adjacent the other side of this partition is another port 38. The arrangement is such that when fluid under pressure enters the port 37 it will tend to propel the vane 27 in a clockwise direction toward an increase pitch and full-weathering position, fluid in the chamber on the opposite side of the vane being expelled through the port 38 during such movement of the vane. When fluid pressure enters through the port 38 with low pressure at the port 37, the vane is driven in the opposite direction toward the cruising pitch and low pitch position and from the low pitch position my invention contemplates as a preferred but not necessary feature, that it may be moved to a zero position and from there to a reverse pitch position.

Formed in the wall of the casing 31 is a duct 39, one end of which opens into the motor chamber through a port 39a which port is located between a normal low pitch position for the vane 27 and a normal cruising pitch position for the vane. These positions for the vane are designated by proper legends on the drawings, and in Figure 6 the vane is shown in full lines in the normal low pitch position. The other end of the by-pass duct 39 opens into the chamber 31 adjacent the port 37 through an inwardly opening check valve 40. The inwardly opening check valve in the particular construction shown in Figure 6 is contained within a nipple screwed into the wall of the casing and the inner end of this nipple is tapered to provide a valve seat at 41. Mounted on the exterior of the casing 31 is a plug 42 in which is a slidable valve member 43. The valve member 43 is adapted to seat when this valve is operated against the seat 41 on the end of the check valve nipple 40. The valve 43 has an outwardly extending valve stem 43' about which there is a compression spring for normally urging the valve 43 outwardly to a retracted position where it is clear of the valve seat 41 so that the by-pass duct 39 is normally open from the port 39a to the check valve 40.

The purpose of the by-pass duct 39 is as follows. Ordinarily when a plane is operating the vane 27 is in a cruising pitch position. If the engine slows down or is throttled down beyond a predetermined point, fluid pressure entering the port 38 forces the vane 27 to the low pitch position. After the vane 27 reaches the low pitch position the port 39a is uncovered and fluid thereafter flows through the by-pass duct 39 and the check valve 40 to the port 37 and the vane is not driven in a counter-clockwise direction past the low pitch position. If fluid under pressure continues to enter the motor chamber through the port 38 it will therefore not affect the position of the vane after the vane reaches the low pitch position unless the valve 43 is operated to close the fluid in the duct 39 from escape through the check valve 40. If the valve 43 is operated to close the check valve and fluid continues to enter the port 38, it cannot then escape through the by-pass duct 39 so that it will then move the vane 27 further in a counter-clockwise direction toward the zero pitch position and then to the reverse pitch position, the amount of movement of the vane 27 depending upon how long the valve 43 is pressed in.

It should be noted that with this arrangement the blade, after it reaches the low pitch position, cannot be moved to the zero or reverse pitch position unless the valve 43 is positively operated, and a manual control to be hereinafter described is provided for the operation of the valve 43 of each of the three motors. It should also be noted that the by-pass port 39a is not uncovered until the vane 27 reaches a low pitch position and it can only reach this position by the slowing down of the engine so that the vane 27 can never be operated to the reverse pitch position except when the engine is turning over more slowly than it normally would be in flight. This is a protection against the blades being inadvertently moved to a reverse pitch position when the plane is in flight with the engines operating at a normal flying speed.

Still referring to Figure 6, there is a second by-pass duct 45 which opens into the cylindrical chamber through a port 46 and which opens at its other end into the chamber through a check valve 47, the check valve 47 being close to the port 38. After the vane has been driven in a clockwise direction to the dotted line position shown in Figure 6 marked "full-feather," the port 46 of the by-pass is uncovered and the continued pumping of fluid into the motor through the port 37 cannot be effective to drive the vane past the full-feather position because after the by-pass port 46 has been uncovered, additional fluid will merely pass through the by-pass 45 and the check valve 47 to the port 38.

Each motor thus comprises a vane which sweeps around within a cylindrical chamber with means for building up a pressure on the one side of the vane while exhausting pressure from the other side of the vane in order to move the vane in one direction or the other. Each motor, in addition, includes by-passes which become effective after the vane has moved a predetermined distance in either direction to prevent further movement of the vane in that direction, except that one of these by-passes is provided with a selectively operable valve for closing the by-pass in order to propel the vane to a position which it otherwise could not normally approach, and such overtravel is used for reversing the pitch of the blades.

The construction features of the assembly are such that access may be had to each of the several motors 22 without removing the gear casing. Whole motor units 22 can be completely replaced except for the pinion 24 without even opening up the gear casing 19—20. At the same time, all of the parts are firmly held in position and are effectively anchored against the centrifugal force to which they are subjected when the propeller is rotating. By using three motor devices for turning the three blades, the space between the blades can be effectively used for the motors and the individual motors are relatively small and compact. This has definite advantages from a construction standpoint over a single large motor for rotating all of the blades. The same movement of all of the blades in exact synchronism is assured by reason of the fact that they are geared together in a closed cycle of gearing. Moreover, the load on any individual gear tooth is reduced because it has to do only half of the work of rotating the propeller blades. The arrangement of the motors and the blades is especially suited for a fluid pressure system of rotating the blades; the weight is evenly distributed about the center of the shaft and it is unnecessary to have any long unsupported extension at the outer end of the crank-shaft of the engine as is required with many types of blade-adjusting mechanisms.

*Propeller—Pitch reversing mechanism*

I have previously pointed out that in order for the vane 27 to rotate past the low pitch position through the zero pitch position to a reverse pitch position the valve 43 has to be operated to close the by-pass 39. The valve stems 43' of the valves 43 all project from the casings 31 rearwardly toward the engine casing. This may be best seen in Figure 3. The ends 43' of the valves 43 are attached to arms 50 (see Figure 3) that project outwardly from a ring 51 which is located at the rear of the gear casing 19. Extending from the rear face of the gear casing 19 are a plurality of studs 52 which pass through eyes 53 on the ring 51. These studs permit the ring 51 to slide in a fore and aft direction while providing a support for the ring on the propeller hub and cause it to be rotated with the hub. Compression springs 54 are provided between the arms 50 and the plug 42 for normally urging the valves to the retracted or open position. The ring 51 provides a means for simultaneously operating all three of the valves 43 against the compression of the springs 54. If the ring 51 as viewed in Figure 3 is moved in a forward direction it will cause all of the valves 43 to simultaneously be pushed toward their seats. The release of pressure from the ring 51 will enable the springs 54 to restore the valves to the open or retracted position.

In order to operate the ring 51, the forward end of the engine casing 2 is provided with a plurality of cylindrical pockets or chambers 55 (see Figure 3), these chambers being arranged in a circular series around the propeller shaft. In each chamber is a plunger 56 and the outer end of this plunger carries a roller 57 that rides on the ring 51. All of the chambers 55 are connected to a common source of fluid pressure through an annular channel 58. The channel 58 in turn communicates with a duct 59 that leads to a source of fluid pressure through a control valve to be hereinafter more fully described. In operation, when fluid under pressure enters the duct 59, it follows around the passage 58 and enters the several cylinders 55 causing the plungers 56 to be thrust forwardly. Pressure is transmitted through the rollers 57 at the forward end of these plungers to the ring 51 to thereby operate the several valves 43. When the valves 43 are operated to close the port 41, fluid cannot thereafter escape through the by-pass 39 so that a further pressure is built up behind the vane 27 propelling it past the zero pitch position to reverse pitch position.

With this arrangement, the operation of the valve 43 on the revolving propeller may be manually effected from stationary elements on the engine. The mechanism described provides a simple means for operating all of the valves and adds very little to the total weight of the engine and propeller assembly. This fact is mentioned in order to show that the feature of reversing the pitch of the propellers may be incorporated in the present invention at very little added cost and with very little added weight to the assembly.

Propeller—Blade-locking mechanism

It has been previously pointed out that the vanes 27 of the several motors are operated by building up a pressure on one side of the vane while allowing fluid to escape from the chamber at the other side of the vane. The fluid flow into and out of the chamber is through the ports 37 and 38. It should be borne in mind that port 37 is the port through which fluid enters the motor for increasing the pitch and for full-feathering the propeller blades and that the port 38 is the port through which fluid pressure enters the motor to move the vane to the low pitch position and to the reverse pitch position. A fluid pressure distributing system through which the fluid pressure from a stationary source on the plane can be directed into the ports 37 and 38 is required. My invention provides, in conjunction with this distributing system, an automatic locking means whereby if the pressure supplied to both sides of the vanes simultaneously drops below a predetermined point, the blades will be automatically locked in the position which they occupy at the time of such simultaneous reduction of pressure on both sides of the vanes so that flight may be continued or the position of the vanes fixed until fluid pressure can be restored to one side or the other or until a landing has been made.

Figure 5:
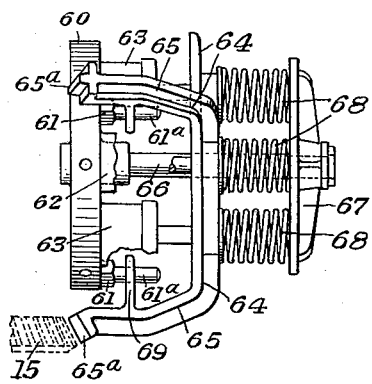
Figure 5 is a fragmentary view of the front portion of the hub assembly shown in Figure 3 with the parts rotated about 15° from the position shown in Figure 3.

Referring to Figures 3, 5 and 11, the front of the hub 4 has an extension 4a extending forwardly therefrom, and this extension terminates in a flange 4b. Set against this flange is an end plate 60 which is secured in place by a series of headed bolts 61 which bolts have integral forwardly extending studs 61a thereon. The front of the plate is also provided with a series of six cup-like cylinders which in reality are two series of cylinders with three cylinders in each series and with the cylinders of one series being alternated with those of the other. These six cylinders are shown in Figure 2, and the cylinders of one series are designated 62 and those of the other series are designated 63. The inner face of the plate 60 is provided with a central port 38a and the plate has three equidistantly spaced radial passages 38b therein (see Figure 11) which lead from the central port 38a to the periphery of the plate. A pipe 38c leads from the outer end of each one of the passages 38b to one of the ports 38 of the blade-rotating motors so that there are three of these pipes 38c, one leading to each one of the three motors. The plate 60 is also provided on its inner face with a series of three ports 37a which communicate with passages 37b formed in the plate 60 and which extend from their respective ports to the periphery of the plate. One tube or pipe 37c leads from the outer end of each of these passages to the port 37 of its respective blade-rotating motor.

Referring to Figure 3, there is a port 62' leading from the bottom of each of the small cylinders 62 into one of the passages 38b. Likewise there is a port 63' leading from the bottom of each of the cup-like cylinders 63 into one of the passages 37b.

In each of the cylinders 62 is a piston 62a and in each of the cylinders 63 is a piston 63a. These pistons are all carried on a spider 64. This spider is provided with three rearwardly projecting arms 65 each of which terminates in a single gear tooth 65a. These arms 65 on the spider lie in the same longitudinal plane as the axes of the trunnions 6 of the hub so that the teeth 65a are positioned directly in front of the pinions 15 on the propeller blades.

Projecting forwardly from the center of the plate 60 is a post 66 having a fixed crosshead 67 thereon. Compression springs 68 are confined between the crosshead 67 and the spider 64 for urging the spider rearwardly, that is toward the left as viewed in Figure 3 for moving the gear teeth 65a on the arms 65 into engagement with the pinions 15. This inward movement of the spider is resisted by the fluid pressure in the series of cylinders 62 and 63. If the pressure in either series of cylinders is sufficient to overcome the pressure of the springs, the locking teeth 65a are held clear of the pinions 15, but if the pressure in both series of chambers drops below a predetermined amount, the springs 68 will move the spider 64 inwardly and cause the teeth 65a to engage the pinions and lock them from rotation. The spider 64 itself is held from rotation by the provision of inwardly extending lugs 69 on the arms 65 which have holes therethrough to fit over the studs 61a on the bolts 61 as most clearly shown in Figure 5. The interengagement of the studs 61a and the arms 69 allows the spider to shift back and forth while holding it from rotation.

Since the cylinders 62 are in communication with the fluid passages 38b leading to the ports 38 of the blade-rotating motors and since the cylinders 63 are in continuous communication with the passages 37b through which fluid is conducted to and from the port 37 of the blade-rotating motors, the locking mechanism will always respond to the pressure in these circuits. Either series of pistons is sufficient to hold the spider in the retracted or released position and it is necessary for the pressure to drop in both series of cylinders 62 and 63 before the springs 68 are effective for moving the spider to blade-locking position.

It has been previously noted that the forward end of the propeller shaft is hollow. Extending rearwardly from the port 38a in the end plate 60 is a central pipe or tube 38d that passes through a transverse partition 70 in the propeller shaft. Packing rings are indicated on each face of this partition. There is a chamber 38e in the shaft to the rear of the partition 70. There is a fluid pressure chamber 37d in the shaft forwardly of this partition, this chamber being closed at the forward end by the plate 60 and the ports 37a in the plate 60 open into this chamber.

The propeller shaft is provided with one or more radial ports 37e leading from the chamber 37d to the exterior of the shaft and there are similar ports 38f leading from the chamber 38e to the periphery of the shaft. Surrounding the shaft at this point is a slip ring 71 having an annular channel 37g therein registering with the ports 37e in the shaft and having another annular channel 38g registering with the ports 38f in the shaft. Fluid under pressure from a control valve to be described is forced from the stationary slip ring into the chamber 37d and through the distributing system described to the ports 37 of the several motors, and the distributing system described also enables fluid to flow through the same channels from the several motors to the stationary slip ring. The slip ring also enables fluid to flow from the slip ring into the chamber 38e and through the circuits described to the ports 38 of the several fluid motors and also to flow from the several fluid motors through the channels described back to the stationary slip ring.

From this point on the further mechanism to be described pertains to the fluid control and distributing circuits and valves through which fluid under pressure is selectively applied to the channels 37g and 38g of the slip ring.

*Pitch reversing control valve*

Figure 4:
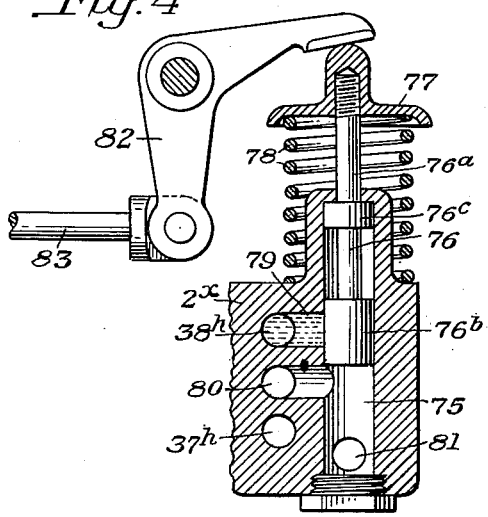
Figure 4 is a detailed view of the pitch-reversing control valve, the view being a longitudinal section through the valve with the operating crank in elevation.

Referring to Figures 3 and 4, it will be noted by reference to Figure 3 that the upper part of the engine casing is formed with an integral lug 2x, and Figure 4 shows a section through this lug in a horizontal direction. As shown in Figure 4, there is a vertical passageway 37h in this lug which is connected through a tube 37i with the distributor channel 37g. The passageway 37h has a nipple 37j at the top thereof. Likewise there is a passageway 38h extending up through this lug parallel to the passage 37h. The passage 38h is connected through a pipe to the slip ring channel 38g, this pipe which is shown only in Figure 1 being designated 38i. There is a nipple connection at the top of the engine casing for the passage 38h, it being behind the nipple 37j and being designated 38j. In the lug 2x there is a horizontal chamber 75 in which is a slide-valve member 76, this member comprising a stem 76a with a main valve portion 76b and a secondary smaller portion 76c spaced from the portion 76b thereby providing an annual valve channel between the parts 76b and 76c. The stem 76a projects beyond one side of the lug 2x and is provided at its outer terminal with a cap 77. A compression spring 78 confined between the cap 77 and the lug serves to urge the valve to the position shown in Figure 4. In this position the part 76c is against the end of the valve chamber preventing further outward movement of the valve. The main valve body 76b in this position extends across the end of a port 79 leading from the passage 38h to the chamber 75. Thus with the valve in this position fluid cannot escape from the passage 38h into the chamber 75.

By depressing the valve, the part 76b may be moved to a position where it completely uncovers the passage 79 and at the same time it may also uncover port 80 which leads from the chamber 75 to the passage 59 (see Figure 3) described in connection with the propeller reversing mechanism.

It will be recalled that the port 38 of the main rotating motors is on the decreasing pitch side of the movable vane and that to move the vane to the reverse pitch position it is necessary to supply fluid pressure to the port 38 while holding the valves 43 closed. All of the connections from the nipple 38j through 38i and 38h, etc. lead to this port 38.

If the valve 76 is operated to establish communication between the port 79 and the port 80 while fluid pressure is being applied to the vane angle-decreasing side of the fluid circuit which includes passage 38h, fluid pressure will then not only flow to the ports 38 of the blade-rotating motors but it will flow through the port 80 into the passage 59 and the annular passage 58 to apply pressure in all of the cylinders 55 to project the plungers 56 to operate the ring 51 and thereby simultaneously operate all three of the reverse valves 43. When the valve 76 is restored to its normal position, the fluid pressure in the several cylinders 55 may be relieved through a vent port 81 at the end of the chamber 75 which vent port is closed when the valve is in a position to establish communication from the port 79 to the port 80. There may be a return line, not shown, for carrying fluid from the port 81 to a sump where all of the return fluid is collected.

The valve 76 is manually operated. For this purpose there is shown a bell crank 82 which would be supported on the engine casing adjacent the cap 77. One arm of this bell crank bears against the end of the cap 77 while the other end is connected with an operating rod 83 leading to a lever located in the pilot's cabin as schematically shown at 84 in Figure 1.

It should be noted at this point that the reversing mechanism described is located entirely on the decreasing pitch side of the fluid pressure motors so that the reversing valve can never be effective to bring about any result when the fluid pressure to the blade-rotating motors is in that circuit leading to the port 37; i. e., the blade pitch increasing port. The reversing mechanism can thus never be operated when the control to be hereinafter described is calling for an increase in the pitch angle of the blades or for automatic full-feathering. Also, it has been previously noted that operation of the reverse valves 43 will not accomplish any result unless the vanes of the motors for rotating the blades have previously reached a low pitch position so that even though the valve 76 should be operated when the blades of the propeller are in a cruising pitch or high pitch position, the reversing operation would not take place.

*Selector—Speed-responsive valve*

Generally stated, the selector comprises a sensing device responsive to the speed of the engine through which a valve is operated to control the admission of fluid under pressure to the circuits leading to the ports 37 and 38 of the vane-rotating motors to increase or decrease the pitch angle of the blades or to automatically rotate the blades to the full-feathered position. In addition, a means is provided whereby the automatic movement of this valve through its full range of positions is restricted until the engine throttle has been advanced to a position encountered in flight to prevent automatic full-feathering in a low throttle position. There is also a manually operable means through which the automatic movement of the blades to the full-feathered position can be prevented and by means of which the movement of the blades to a full-feathered position can be accomplished manually. That mechanism through which the normal operation of the valve is correlated to the throttle of the engine is further designed to provide means through which the blades may be unfeathered after they have been moved to the feathered position.

The selecting mechanism may be located at any convenient point adjacent the engine and propeller which the selector is to control. In practice it is contemplated that the top of the portion 2x in Figure 3 may provide a mounting for this unit, although its position is not material, and as previously indicated, it may be located at any convenient point.

Referring first to Figures 12 to 17 inclusive, this device comprises a body designated generally as 90 having a central main valve chamber 91. In the valve chamber 91 is a slide valve 92, this slide valve having three pistons or valve elements thereon designated 92a, 92b and 92c and between the pistons 92a and 92b is an annular passage 92d, and there is a similar annular passage 92e between 92b and 92c. Projecting from the lower end of the member 92 is a non-circular or square extension 93 which slidably passes through a closure 94 at the bottom of the chamber 91.

There are two ports which pass through the valve body and communicate with the interior of the chamber 91, these being designated 37l and 38l respectively. They are connected through tubes 37m and 38m respectively with the nipples 37j and 38j previously described. The ports 37l and 38l are separated longitudinally a distance equal to the separation of the valve elements 92a and 92b and of the valve elements 92b and 92c.

Opening into the valve chamber 91 opposite the ports 37l and 38l and midway between these two ports is a port 95 which port leads from a second valve chamber 96 in which is a slide valve 97, the slide valve 97 being positioned transversely to the valve 92. A source of fluid pressure leads into the valve chamber 96 through a pipe 98.

A threaded stem or shaft 99 is screwed into the end of the valve 92, the parts 92 and 99 having a threaded telescoping fit. Fixed on the upper end of the shaft 99 is a driving pinion 100 through which the shaft 99 can be turned to screw it in or out of the valve 92, the valve 92 being held from rotation during such turning of the shaft 99 by the square extension 93 which passes through a square hole in the guide 94. The shaft 99 has an upper terminal portion which forms a ball and socket joint with the lower end of a sleeve 101. The sleeve 101 is arranged to slide up and down on a shaft 102 that carries a centrifugal fly-ball or governor mechanism 103, there being links 104 through which the sleeve 101 is moved up and down as the position of the fly-balls changes. There is shown a pinion 105 at the top of the shaft 102 through which the governor or fly-ball mechanism may be rotated.

As the speed of the governor changes causing the sleeve 101 to move up and down, the valve 92 is correspondingly moved up and down, but because of the ball and socket connection between the sleeve 101 and the shaft 99, the shaft 99 does not rotate with the governor.

It is contemplated that the governor shall be driven from the crank-shaft on which the propeller to be controlled is carried. This drive is schematically illustrated in Figure 1 where the pinion 105 is engaged with a gear 106 at the end of a shaft 107 which in turn has a bevel gear 108 thereon, the bevel gear meshing with a pinion 109 on the engine shaft 3.

The fly-ball mechanism or governor provides a means for operating the valve, but the relation between the valve and the governor may be changed by rotating the shaft 99 to screw it in or out of the valve 92 and thus increase or shorten the length of the coupling between the valve 92 and the governor-operated sleeve 101. For screwing the shaft 99 into or out of the valve 92 while the valve is in operation and for holding the shaft 99 against accidental rotation, the pinion 100 is provided, which meshes with a relatively long cylindrical gear 110 which gear is supported in the casting 90 on a shaft 111. The shaft 111 is provided also with a bevel gear 112 that meshes with a much larger pinion 113. As shown in Figure 16, the pinion 113 is at one end of a flexible shaft 114. The other end of the flexible shaft is connected to an operating lever 115 which is remotely located from the valve and which is positioned in the pilot's control cabin. The operating lever or control handle 115 is associated with a suitably calibrated dial 116, and the arrangement is such that by rotating the handle 115 in a clockwise direction as viewed in Figure 16, the pinion 113 may be rotated to drive the gear 110 to screw the shaft 99 from the relation shown in Figure 18 to the relation shown in Figure 18A; i. e., to decrease the length of the coupling between the governor and the valve. This decrease in the length of the coupling changes the ratio of the full-feathering speed to the constant engine speed. Moving the dial 115 toward the right; i. e., in a clockwise direction as viewed in Figure 16, causes the propeller to full-feather at a lower engine speed and rotating it in a counter-clockwise direction provides a setting where the propeller will automatically full-feather only at a high engine speed. This will become evident as the further functioning of the valve 92 is explained.

In the wall of the main valve chamber 91 there are two outlet ports 37n and 38n, the former being above the port 37l and the latter being below the port 38l. These ports communicate with a common fluid return pipe as indicated in the diagram of Figure 1, this fluid return pipe being designated 117.

Figure 1:
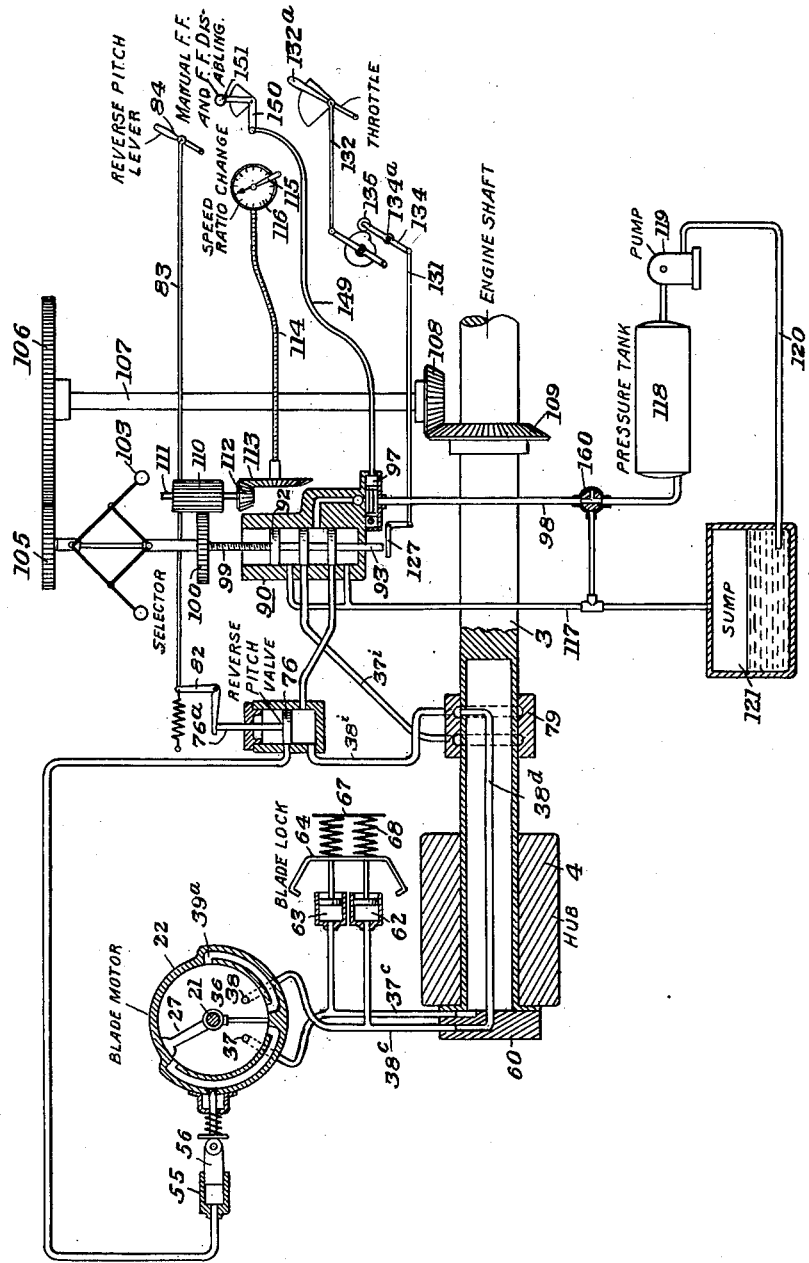

The pipe 98 leads to a source of constant fluid pressure as indicated in Figure 1 by the pressure tank 118. The constant pressure in this tank is maintained by any suitable pump mechanism as schematically illustrated at 119 in Figure 1. A pipe 120 leads from the sump 121 to the intake side of the pump. The source of fluid pressure should be independent of the engine whose speed is to be controlled and for this reason the pump 119 is preferably driven independently of the engine shaft from an electric motor or other driving source, not shown.

*Operation of selector valve—Constant speed*

Before discussing the different positions of the selector valve 92, it should be borne in mind that the speed of the governor and the pitch changes of the blades of the propeller can be effected by a change of attitude of the airplane while proceeding through the atmosphere due to increasing or decreasing the load on the engine while the throttle position remains constant as for example, by going into a climb or a glide or by change in atmospheric conditions as for example, going from a dense atmosphere at sea level to a rare atmosphere at high altitude or vice versa, or the speed of the governor and the pitch changes of the blades can be effected by a change of throttle position while the attitude of the plane or the atmospheric conditions remain constant, or a change in the speed and the blade angles can be effected by altering both the throttle position and the attitude of the plane simultaneously.

For the purpose of the present description, it will be assumed that the throttle position remains constant and that the change in the speed of the governor and the consequent altering of the pitch of the blades is the result of the increase or decrease of the load on the engine and the change of attitude of the plane in flight or the change of the atmospheric conditions.

Assuming that the maximum permissible h. p. rating of the engine is at 2500 R. P. M., then the pilot first sets the control at 115 (Figure 16) to the "high cruise" position as shown. Movement of the indicator 115 to the high cruise position rotates the pinion 113, and by reason of the large diameter of 113 to gear 112, one revolution of 113 may produce several turns of gear 112, and of course several turns of the cylindrical gear 119. This setting of the indicator, therefore, rotates the shaft 99 to screw the shaft 99 out of the valve 92 and elongate the coupling between the governor and the valve.

It is assumed that the mechanism has been so constructed that when the propeller is revolving at 2500 R. P. M. and when the dial has been set at the high cruise position, the governor arms take the position shown in Figure 18. In this position the ports 37l and 38l are both closed, and high pressure fluid from the port 95 cannot escape through either the ports 37l or 38l. Likewise, there can be no communication in this position from ports 37l and 38l to the vent ports 37n and 38n. As long as the R. P. M. of the propeller remains constant, a hydraulic lock exists between the fluid circuits supplied to the ports 37 and 38 to both sides of the vanes of the blade-rotating motors and no movement of the vanes takes places.

*Operation of selector valve—Increasing pitch*

In the event that the propeller should increase its R. P. M. due to a change of the attitude of the plane, such as a glide or due to atmospheric conditions, as for example the plane reaching a more rarefied atmosphere, then the fly-balls of the governors move outwardly to the position shown in Figure 19. Fluid pressure may then flow from the port 95 through the valve passage 92d to the pitch increasing port 37l. Fluid will then flow from port 37l, connection 37m and nipple 37j to the collector ring 37g to the chamber 37d and through the distributor plate and through the passage 37a in the distributor plate 60 through pipes 37c to the ports 37 of the several blade-rotating motors. Communication will be established from the port 38l (Figure 19) to the discharge port 38n. With this setting of the selector valve, the fluid under pressure propels the vane toward the right in a clockwise direction as viewed in Figure 6, while the vane in moving in a clockwise direction will force liquid in the chamber out the ports 38, through the passages leading from this port to the collector ring 38g and from the collector ring to the selector valve port 38l and from this port the liquid escapes through a vent 38n and is discharged into the sump.

The increasing of the pitch of the blades will of course increase the load on the engine thereby causing the engine to slow down and when the engine has thus been slowed down to the selected constant speed of 2500 R. P. M., the parts will then assume the position shown in Figure 18, but the blades of the propeller will have been advanced to the increased pitch position. If the engine should again speed up, the cycle would be repeated and the vane 27 would be advanced a further increment in a clockwise direction.

It will be noted that if the blade-locking mechanism was in the blade-locking position at the time of the operation of the valve to the position shown in Figure 19, the fluid under pressure, in passing to the several blade-rotating motors, would also enter the cylinders 63 and force the blade-locking spider 64 outwardly to the inoperative position. When the blades are being rotated to the increasing pitch position, the pistons 62 of the blade-locking mechanism would be in a low pressure circuit because the liquid in this circuit is then flowing to the sump. If the source of fluid pressure in the circuit leading to the ports 37 should fail at this time, the cylinders 63 as well as the cylinders 62 would then both be inoperative and the blade-locking mechanism would instantly become effective to hold the blades in the position in which they were set until a landing had been made or until normal conditions could be established.

*Operation of selector valve—Decreasing pitch*

In the event that the propeller should decrease its R. P. M. due to a change of attitude of the plane, such for example as would occur in a climb, or due to atmospheric disturbances or change, the fly-balls on the governor move inwardly from the position shown in Figure 18 to the position shown in Figure 20, and communication is established through the valve passage 92d from the port 95 to the decreasing pitch port 38l, and at the same time communication is established from port 37l to the vent port 37n. The flow of fluid pressure is then from the source through the selector valve to the collector ring 38g and passage 38d to the radial passages 38b and thence through pipes 38c to the ports 38 of the three blade-rotating motors, while the connections leading from the port 37 communicate directly to the sump. This allows the vane 27 to be moved in a counter-clockwise direction as viewed in Figure 6 to decrease the pitch of the blades. The fluid pressure thus communicated to the port 38 also enters the ports 62 to hold the blade-locking mechanism in its inoperative position. While the pitch is decreasing, the connections leading from the ports 37 become a low pressure circuit, and should the high pressure to the ports 38 fail and both circuits become non-pressure circuits, the locking spider would be forced in to hold the blades in the locked position until a landing has been made or until normal circuit conditions have been established. It should also be noted that when the vane 27 reaches the low pitch position as shown in Figure 6, the port 39a is uncovered so that a free flow of fluid may exist from the port 38 through the port 39a and out the port 37 thus creating a low pressure condition in both sides of the fluid circuit whereby the blade lock will automatically become effective as soon as the blades have reached the low pitch position. In reversing the pitch of the blades, the closing of the valve 43 to close the by-pass 39 restores a condition of pressure in the circuit leading to the port 38, which circuit includes the cylinders 63 of the blade-locking mechanism for releasing the blade-locking mechanism to enable the vane 27 to move to the zero and reverse pitch position.

*Operation of selector valve—full-feathering*

In the event that the airplane is proceeding through the air with the propeller revolving at a constant speed of 2500 R. P. M. and if for any reason the engine should lose power, then an immediate drop in R. P. M. would occur. However, the constant speed governor would operate to compensate for this drop in R. P. M. to move the blades to a decreased pitch position. That is to say, that under these conditions, the parts would move from the position shown in Figure 18 to the position shown in Figure 20 the same as for decreasing the pitch of the blades. If a further loss in engine power develops, another drop in R. P. M. occurs and compensation is again made by decreasing the pitch. This cycle of operations will continue until the vane 27 reaches the position marked "low pitch" in Figure 6. Further decrease of speed cannot be compensated for beyond this low pitch position because the fluid will escape through by-pass 39 and be ineffective to further rotate the vane 27, and the governor balls will then drop to the position shown in Figure 21. This will move the selector valve to a position where high pressure fluid from the port 95 will pass through the valve passage 92e into the increasing pitch port 37l, while the decreasing pitch port 38l will again be in communication with its vent. This will cause fluid pressure to flow into the ports 37 of the several vane-rotating motors moving the vanes in a clockwise direction as viewed in Figure 6 and increasing the pitch of the blades. Since the engine is already operating below speed, the further increase of the pitch of the blades will only serve to slow it down, and the vanes 27 will be rotated clear around past the by-pass port 46 to the position marked "full-feather" in Figure 6. Continued flow of fluid into the port 37 after this position has been reached will cause such fluid to be by-passed through port 46 and by-pass 45 to the outlet port 38. As soon as the vane 27 has uncovered the port 46, the fluid can enter the port 37 and discharge from the port 38 without any resistance to its flow being built up. Both sides of the circuit then become non-pressure circuits and the pressure is insufficient in either the cylinders 62 or 63 to hold the blade-lock in the inoperative position and the lock becomes effective to hold the blades in the full-feathered position.

Figures 18 to 21 show the position of the valve in relation to the fly-ball governor for a relatively high constant speed. If, for purposes of economy or for other reasons, it is desired to operate the plane with the engine operating at a lower constant speed, the operator moves the indicator 115 from the high speed toward the decrease speed position, the dial 116 being calibrated for different engine speeds. For the purpose of this specification it may be assumed for example, that 2500 R. P. M. is the upper limit of the speed range for the control and 1800 R. P. M. is the lower limit. If the operator moves the indicator 115 to the 1800 R. P. M. position, it will turn the pinion 113 to drive the gear 110 through several revolutions and screw the shaft 99 into the valve 92 to establish the closest permissible coupling between the governor-operated sleeve 101 and the valve.

The series of drawings Figures 18A to 21A show the selector valve 92 in the same position as this valve occupies in the corresponding series of drawings, Figures 18 to 21 inclusive, but with this closer coupling between the governor and the valve. By reference to Figure 18A which is the constant speed position, the governor balls are in the position which they will occupy at a speed of 1800 R. P. M. It will be noted that this position of the balls is practically the same as the position of the balls in Figure 21 which is the full-feathering position in the high speed setting. The valve, however, is in the same position as shown in Figure 18 and no fluid pressure circuit is established from the source to either side of the vane 27. If the engine speeds up, the governor balls move to the position shown in Figure 19A whereupon high pressure fluid can flow from the high pressure source to the high pressure valve port 37l, the valve then being in the same position as the valve in Figure 19. If the engine speed decreases, the governor balls move inwardly from the constant speed position of Figure 18A and communication is established from the pressure source to the decrease pitch port 38l, the valve then being in the position shown in Figure 20A. If the propeller slows down to a point where further reduction of pitch of the blades will not regain the constant speed of the engine, the governor balls then drop to the position shown in Figure 21A in which the high pressure fluid source is connected to the increase pitch port 37l to drive the vane 27 around to the full-feathering position of the blades, the valve being in the same relation to the ports in this figure as in Figure 21. The difference in the two figures is in the position of the governor balls.

By reference to Figures 20 and 20A it will be observed that the valve to the decrease pitch port 38l is open only when the speed of the engine has dropped below the constant speed. This is the only time, therefore, that pressure would be available for operating the plungers 56 to close the valves 43 and therefore the pitch of the propeller blades can be reversed only when the engine is operating at a speed below the constant speed and only after the vanes 27 (Figure 6) have first been retarded to the extreme low pitch position. It may be noted that when the vane is in the low pitch position and the fluid can flow from the port 38 through the by-pass port 39a and by-pass 39, both sides of the fluid circuit become non-pressure circuits and the blade-locking mechanism will lock the blades so that when the blades are in the full-feathered or low pitch position, the blade-locking mechanism is in its operation position.

*Selector valve—Throttle-controlled full-feathering check and automatic unfeathering*

Referring to Figures 12, 13, 14 and 15, it will be noted that a bracket 125 is formed on the casting 90. This bracket has a shaft 126 passing therethrough. There is a lever 127 keyed to the shaft 126 so as to rotate with the shaft. This lever has a terminal portion 128 which is directly under the non-circular extension 93 on the valve 92. As shown in Figure 14, this lever may be rocked downwardly to a position where it is entirely clear of the extension 93, or as shown in Figure 15, it may be swung upwardly to a position where it prevents the valve 92 from dropping past the decrease pitch position of Figure 20 or lifts the valve to this position if it has previously dropped to the full-feathering position. Hung from the shaft 26 but movable relatively to the shaft is a yoke-shaped lever 129, the two arms of which engage the shaft 126 near opposite ends thereof. This yoke-shaped lever 129 has a cross arm or abutment 130 thereon which passes under the arm 127. By moving the lever 129 to the left as viewed in Figure 14, the part 130, bearing against the under-side of the lever 127 will serve to lift this lever to the position shown in Figure 15. At the same time, if the arm 127 is held in the position shown in Figure 15 by some other means, the lever 129 can swing back and forth about the shaft 126 as a pivot without moving the arm 127.

An operating rod 131 is connected to the free end of the arm 129, and this operating rod is tied in with the throttle mechanism of the engine in such a way as to move the lever 129 according to the position of the throttle. In Figure 14 one arrangement for connecting the rod 131 into the throttle system is shown. In these views there is an operating rod 132 leading from a throttle lever 132a (Figure 1) in the control cabin of the plane to the throttle valve 132b of the engine. Mounted on the shaft of the throttle valve is a single-lobe cam 133. The outer end of the rod 131 is pivotally connected to one end of a lever 134 which lever is pivotally supported at 134a, the lever 134 having a cam-engaging roller 135 at its free end. In Figure 14 the throttle valve 132b is in the position which it assumes when the motor is operating at a flying speed. At this time the roller 135 is on the low part of the cam and the arm 129 is accordingly pulled back to a position where the lever 128 is clear of the extension 93 of the valve 92. When the rod 132 is operated to move the throttle 132b to a low speed position, that is a position below flying speed, which position is extensively used for ground maneuvering, the lever 134 is moved by the cam 133 to the position shown in Figure 15, causing the lever 129 to be swung to the left as viewed in Figure 15 whereby the portion 130 of this lever lifts the arm 127 upwardly and the terminal 128 of the lever 127 then prevents the valve 92 from dropping down to the full-feather position.

By reason of the foregoing mechanism, the automatic movement of the valve 92 to the full-feathering position is prevented when the engine is being operated at speeds below normal flying speeds. Thus the blades will not full-feather when the plane is being maneuvered on the ground or when the engine is idling before the plane takes off.

The mechanism which has just been described also provides a means for automatically causing the propeller blades to be unfeathered if the pilot desires to unfeather the blades. It will be recalled that automatic full-feathering occurs only when there is a decrease in the engine speed which cannot be compensated for by a decrease in the pitch of the blades. Also, because of the mechanism just described, full-feathering cannot take place when the throttle of the engine is retarded beyond a predetermined throttle setting. If automatic full-feathering occurs, it therefore occurs when the engine is operating at a flying speed. When the blades full-feather in flight, the pilot leaves the throttle in this flying speed position but of course cuts off the engine if the engine has not of itself failed. If, after automatic full-feathering has taken place and a repair has been made to the engine or for some other reason it is desired to unfeather the blades, it is merely necessary for the pilot to retard his throttle to the position shown in Figure 15. This lifts the valve 92 from the full-feathered position to the decreased pitch position. In this position the fluid from the pressure source will flow through the selector valve to the pitch decrease port 38l and thence to the ports 38 of the blade-rotating motors. This creates pressure on the vane 27 which rotates the vane from the full-feathered position toward the low pitch position. At the same time, when fluid pressure flows through the port at 38l to unfeather the blades, pressure is built up in the series of cylinders 62 to release the blade-locking mechanism 65. Therefore, the pilot may unfeather the blades after full-feathering has taken place automatically by retarding the throttle of the engine.

*Selector valve—Manual full-feathering*

Referring to Figure 13, it will be noted that at each side of the selecting valve chamber 91 there is a small cylinder, the one on the left in Figure 13 being designated 140 and the one to the right being designated 141. In the cylinder 140 is a piston 142 with a stem 143 that projects through the top of the cylinder. Pivotally secured to the casting 90 is a lever arm 144 (see Figures 13 and 25), and the outer end of this arm has a terminal 145 that engages the top of the piston rod 143. Secured to the lever 144 is the upper end of a depending link 146. The lower end of the link 146 is connected to a short crank-arm or lever 147 that is keyed to the shaft 126. The arrangement is such that when fluid pressure is applied to the cylinder 140, the piston 142 may be lifted and the motion of this piston transmitted to the lever 144 and from the lever 144 to the shaft 126 to move the lever 127 upwardly. Figure 29 shows the piston 142 in the highest position to which it can be moved and in this position it will be noted that the arm 127 engaging the extension 93 on the valve 92 has forced this valve up beyond a position shown in either Figures 14 or 15. In Figure 29 the valve is lifted to a position corresponding to Figure 19 in which the high pressure fluid from the source communicates with the pitch-increasing and full-feathering port 37l. From the foregoing it will be seen that by admitting fluid under pressure to the cylinder 140, the selecting valve 92 can be raised to a position where fluid under pressure may flow from the high pressure source to the port 37l and from this port through the various channels to the port 37 of the vane-rotating motor to drive the vane 27 (Figure 6) to the full-feathered position.

The operation of the piston 142 in the cylinder 140 is controlled by the valve 97. The arrangement of this valve is best shown in Figures 17 and 25. The valve chamber 96 into which the fluid supply line 98 opens extends crosswise of the casting 90. The valve 97 has two separated valve portions or pistons 97a and 97b with an intervening portion 97c of reduced diameter, the portion 97c providing a valve passage. There is a port 148 leading from one end of the valve chamber 96 into the cylinder 140. By moving the valve 97 from the normal position shown in Figure 22 to the manual full-feathering position shown in Figure 24, the high pressure fluid, in addition to entering the port 95, and flowing from this port through the selector valve to the increasing pitch port 37l may also flow laterally along the valve chamber 96 through the port 148 into the cylinder 140 to raise the piston in said cylinder to the position shown in Figure 29 and thus cause the blades to be full-feathered through the manual operation of the valve 97. It is contemplated that this manual operation shall be effected from a control lever in the pilot's cabin. This is best illustrated in Figure 17 where a flexible operating cable 149 of the Bowden wire type is attached to the valve 97. The other end of this cable is attached to an arm 150 of a bellcrank-shaped control lever 151. When this lever is in the mid-position shown in Figure 17, the valve 97 is in the mid-position shown in Figure 22. When the lever 151 is moved to the left as viewed in Figure 17 to the manual full-feathering position, the valve 97 is shifted so as to effect manual full-feathering in the manner hereinbefore described.

For relieving fluid pressure in the cylinder 140 when the valve 97 has been moved back to the normal position of Figure 22, a vent opening 152 is provided in the valve chamber 96 at the extreme left-hand end thereof. Although it is not shown, a pipe may lead from this vent 152 to the pipe 117 through which fluid is carried back to the sump.

*Selector valve—Full-feather disabling mechanism*

If, instead of moving the lever 151 in Figure 17 to the left, it is moved to the right, the valve 97 will be moved to the right as shown in Figure 23. In this position high pressure fluid from the supply source 98, in addition to flowing through the main passage or port 95, will also flow laterally along the valve chamber 96 into a port 153 to the cylinder 141.

In the cylinder 141 there is a piston 154 with a piston rod 155 that projects through the top of the cylinder, and the upper end of this rod engages a lever 156 pivotally secured to the outside of the valve block 90. A link 157 is attached at its upper end to the lever 156. Its lower end is connected to a crank-arm or lever 158 which is also keyed to the shaft 126 so as to turn the shaft 126 to rock the stop lever 127.

When the valve 97 is set to the position shown in Figure 23 so that high pressure fluid enters the cylinder 141, the piston 154 is driven upwardly lifting the lever 156 and thereby moving the arm 127 up to the position shown in Figure 28. In this position of the lever 127 the stem 93 of the selector valve is prevented from dropping down to the full-feathered position even though the throttle-controlled element 129 might permit such lowering movement of the arm.

Since the valve cannot drop to the full-feathering position, the blade cannot automatically full-feather. The piston 154 does not have as long a stroke as the full-feathering piston 142 and as long as the valve 97 is set to hold the piston 154 in the position shown in Figure 28, manual full-feathering cannot be accomplished. Full-feathering, either automatic or manual, is thus completely disabled at any engine speed until the control knob 151 has been moved to shift the valve 97 out of the full-feather disabling position.

By comparison of Figures 25 and 26 and Figures 27 and 28 and Figures 29 and 30, it will be seen that while the cylinders 140 and 141 both operate to move the limit finger 127, the position of the valves is always such that one mechanism at no time opposes the other and neither of these mechanisms interferes with the throttle-operated lever 129 for moving the finger 127 up and down.

There is a vent port 159 at the other end of the valve corresponding to the chamber 96 opposite the vent port 152 and provided for the purpose of venting the full-feather disabling cylinder 141 when the valve 97 is restored to the normal position shown in Figure 22.

*General description*

The general relation of the various parts of the invention is schematically illustrated in Figure 1 except that in this view which is provided primarily to show the fluid circuits, the manual full-feathering cylinder 140 and the full-feathering disabling cylinder 141 are not shown, although the valve 97 is schematically illustrated.

Referring to Figure 1, there may be times when it is desirable to lock the blades in a predetermined position and render all of the various hydraulic mechanisms inoperative. For this purpose a three-way valve 160 may be provided in the pressure line 98 in such a position as to cut off the flow of fluid to the selector valve and at the same time permit such fluid as may be in the valve to drain back into the sump line 117. When this valve is turned to the closed position, the automatic locking mechanism comprising the two series of cylinders 62 and 63 and the spider construction 64—65 and the associated parts is rendered ineffective for holding the blade lock in its inoperative position, and the locking mechanism will operate under the action of the springs 68 to lock the blades against any movement.

When the fluid system is operating it is of a self-regulating character. For example, should there be a slight seepage such as would unbalance the pressures on opposite sides of the vanes 27 when the propeller was running at a constant speed and the selector valve therefore did not permit of fluid being supplied to either side of the vane, the blades of the propeller might creep in one direction or the other and change the pitch slightly. As soon as this would happen there would be an increase or decrease in the R. P. M. of the motor due to the change of the load, and the selector valve would be operated to restore the blades to the proper position.

In the description of the invention I have given examples for an assumed extreme high R. P. M. and for an assumed low R. P. M. It will be understood that this range can be decreased or increased and that the system will operate at any selected speed between the maximum and minimum ranges giving automatic controllable pitch over a wide range of flight regimes. A further advantage that is inherent in my invention is that a single source of high pressure fluid is used to both increase or decrease the pitch. The movement to a high pitch or low pitch position is accomplished under hydraulic pressure, and no springs are required. An important advantage of the invention is that automatic full-feathering will occur at any predetermined reduction of R. P. M. below a pre-set value for any flight regime within the range over which the control is effective. In the present system the propeller blades are first moved to a low pitch position before automatic full-feathering, so that the engine will always seek to restore its constant speed before the blades are full-feathered but manual full-feathering of the blades can be accomplished directly from an existing pitch position to a full-feathered position without going into the low pitch position.

The invention requires no extra controls to unfeather the blades after they have been automatically full-feathered, it being only necessary to retard the throttle for the engine, and no extra controls are necessary to test full-feathering before starting the engine. It is only necessary to advance the throttle and then retard the throttle to normalize the blades to the low pitch position. In other words, the mechanism can be tested while the engine is stationary.

An important advantage of the invention is that for military operations an unlimited pitch angle can be reached in a power dive. A safety feature is provided in the automatic blade-locking mechanism. Advantages arise from the fact that the blades automatically stop and lock in the full-feather position, automatically stop and lock in the low pitch position, and that the blades automatically unlock during pitch changes. The automatic stopping and locking of the blades in the low pitch position occurs by reason of the provision of the by-pass 39 in Figure 6 so that after the blade has reached the low pitch position and uncovered the by-pass 39a, further fluid supplied to the unit will by-pass through the port 39 to the port 37. When the by-pass 39a is uncovered, both sides of the circuit become non-pressure circuits and the automatic lock becomes effective as previously described the same as when the vane 27 reaches the full-feather position.

Another important advantage of the invention is in the fact that the pitch of the blades may not be reversed unless they have first been retarded to the lowest forward pitch position, and the low forward pitch position is normally attained only with a low speed throttle position. One reason why this is important is that it is not possible for the operator, with the system as shown, to accidentally reverse the pitch of a propeller while the plane is flying with the throttle in the position it would be in for normal flying. A second important advantage is that as the blades move in the range of and through the position of zero pitch, the load on the engine decreases because the propeller is doing practically no work when the blades are in this range, and this tends to speed up the engine and let it "race." If the throttle is in a low speed position, the engine will not excessively overspeed or race during the movement of the blades in the zero pitch range. Reversing is very desirable for maneuvering a ship, especially a multi-motored ship, on the surface and is particularly useful for the surface maneuvering of seaplanes. Also, on a multi-motored plane, as for example a military bomber, pitch reversing in flight may be resorted to for making quick turns. With my invention, the pilot of a military plane, for example, may set the lever 84 in the reverse position before reaching a zone of action, and then, when the occasion requires a quick turn, he has only to decrease his throttle to a point where the blades are moved into the low forward pitch position when the reversing operation will begin, but until the setting of the throttle to a low speed position has been accomplished, the initial setting of the reverse lever 84 will be ineffective, and the blades will automatically go out of reverse without operating lever 84. The pilot determines the extent to which the blades are reversed after which he may operate the reverse control lever to cause the valve 43 to be opened thereby opening the by-pass 39, and the blade lock will then become effective to hold the propeller blades in the position to which they have been moved. If, however, the engine is speeded up beyond a predetermined speed, causing the selector valve to be moved to the position shown in Figure 19, high pressure fluid will be supplied to the port 37 and the blades will automatically be advanced to a forward pitch position. This forces the pilot to use the reverse with care by having a throttled engine. The invention enables the pilot of a multi-motored military ship to approach a zone of action with the levers for that engine on each wing which is farthest from the center pre-set for quick reverse, but reverse will normally occur only in response to a deliberate throttle movement. If the reverse lever 84 is re-set to forward position, before such throttle movement has taken place, the blades of course will not be moved to the reverse pitch.

Because of the pinion 15 on each of the propeller blades being on the exterior of the blades, they are of relatively large diameter and consequently the movement of the driving gears 24 is effective through a favorable leverage for rotating the blades. Moreover, due to the fact that the pinions on the blades are twice the diameter of the pinions on the motors, the torque of the motors is amplified for rotating the blades. By having the motors midway between the blades and having the same number of motors as blades, the balance of the propeller is maintained and space is utilized for the motors so that it is unnecessary to have any extension on the front of the hub much beyond the end of the hub, and the overhanging load on the propeller shaft is kept close to the crank-case of the engine. A factor of safety is also provided in having three blade-operating motors instead of a single one, and the bulk of the assembly is reduced by using three small motors instead of a single large one. The construction and arrangement of the motors and of the blades at the hub of the propeller is also of practical importance from the standpoint of access to the various parts for inspection and adjustment. As previously pointed out, all of the gearing and all of the parts in the hub are readily accessible by removing only the front part of the gear casing about the hub. Nevertheless the gear casing completely encloses all of the removable parts except the blades themselves so that ice cannot form on the movable parts to interfere with the operation of the variable pitch and full-feathering mechanism.

In some cases it may be desirable to change the speed at which full-feathering will occur in relation to the speed of the propeller. The adjustment provided by the adjustable connection between the governor and the valve through the use of the threaded shaft 99 enables the speed at which full-feathering will occur to always be below the selected constant speed, but if the unit is constructed, for example, for the propeller to full-feather when the speed drops 200 revolutions below the selected constant speed, this adjustment is ineffective for increasing the differential between the constant speed and the full-feathering speed to say, 300 for example.

The modification shown in Figures 31 to 35 inclusive enables this ratio to be changed. In these figures the selector valve is shown and the same reference numerals have been used to designate the corresponding parts as those previously used in the description of the selector valve. In these views the only difference between the valve previously described and the one shown in the modification is that the middle valve member 92b is provided on its top surface and at its periphery with a lug 92x which is most clearly shown in Figure 33, this lug preferably having one end terminating in an abrupt shoulder 92y and having the other portion tapered as indicated at 92z, the intervening part of the lug being flat as shown. The non-circular extension 93 at the bottom of the valve passes through a rotatable bushing 94 at the bottom of the valve chamber 91. By rotating this bushing, the lug or barrier 92x may be moved from the position shown in Figure 31 where it is entirely to one side of the pressure inlet port 95 to the position shown in Figure 32 where it moves across the pressure inlet port 95 or it may be moved to a position where the inclined portion 92z moves across the pressure inlet port 95. When the barrier is in the position to move across the inlet port 95, the valve element 92 has to move a greater distance under the action of the governor before fluid can flow from the port 95 through the valve passage 92e to the pitch-increasing and full-feathering port 37l. This means that the speed of the propeller must decrease further with the valve set in this position before full-feathering can occur, than when the barrier or lug 92x is turned to a position where it does not travel across the port 95.

The adjustment provided by this modification is intended to be made as a ground adjustment and not while the plane is in flight. Figure 34 shows the valve stem 93 in the position which it occupies when the lug or barrier is clear of the port 95 and Figure 35 shows the valve turned to a position at right angles to Figure 34 to bring the lug into an effective position.

It will of course be appreciated that various features described in connection with the propeller may be omitted without impairing the functions of some of the other features. For example, it would be quite feasible to omit the reversing of the pitch of the blades where this feature is not thought to be desirable. It would not require any modification of the propeller or of the fluid circuits, however, to omit the reversible pitch feature, other than the mere omission of certain parts and passages.

While I have pointed out some of the advantages of my invention, it will be apparent to those skilled in the art that there are numerous other advantages. Also, while I have shown and described one particular embodiment of the invention, it will be understood that various changes and modifications may be made in the construction and arrangement of the parts within the contemplation of my invention and under the scope of the following claims.

I claim:

1. For use in operating a variable pitch propeller comprising a hub having axially rotatable blades thereon the mechanism comprising, fluid pressure motor means on the hub for rotating the blades about their axes, fluid circuits to said motor means, one of said circuits being for moving the motor means toward an increased pitch and full-feathered position and the other for moving the blades toward a minimum pitch position, a source of fluid pressure for said circuits, and a selector valve for controlling the flow of pressure from said source to said circuits, said valve being progressively movable from a position to supply fluid under pressure to the first of said circuits, then to the second of said circuits and while moving in the same direction, back to the first of said circuits.

2. For use in operating a variable pitch propeller comprising a hub having axially rotatable blades thereon the mechanism comprising, fluid pressure motor means on the hub for rotating the blades about their axes, fluid circuits to said motor means, one of said circuits being for moving the motor means toward an increased pitch and full-feathered position and the other for moving the blades toward a minimum pitch position, a source of fluid pressure for said circuits, a selector valve for controlling the flow of pressure from said source to said circuits, said valve being progressively movable from a position to supply fluid under pressure to the first of said circuits, then to the second of said circuits and while moving in the same direction, back to the first of said circuits, and means responsive to the speed of the propeller for actuating said valve.

3. For use in operating a variable pitch propeller comprising a hub having axially rotatable blades thereon the mechanism comprising, fluid pressure motor means on the hub for rotating the blades about their axes, fluid circuits to said motor means, one of said circuits being for moving the motor means toward an increased pitch and full-feathered position and the other for moving the blades toward a minimum pitch position, a source of fluid pressure for said circuits, a selector valve for controlling the flow of pressure from said source to said circuits, said valve being progressively movable from a position to supply fluid under pressure to the first of said circuits, then to the second of said circuits and while moving in the same direction, back to the first of said circuits, means responsive to the speed of the propeller for actuating said valve, and selectively operable means for preventing movement of the valve to said third position under the influence of said speed-responsive means.

4. For use in operating a variable pitch propeller comprising a hub having axially rotatable blades thereon the mechanism comprising, fluid pressure motor means on the hub for rotating the blades about their axes, fluid circuits to said motor means, one of said circuits being for moving the motor means toward an increased pitch and full-feathered position and the other for moving the blades toward a minimum pitch position, a source of fluid pressure for said circuits, a selector valve for controlling the flow of pressure from said source to said circuits, said valve being progressively movable from a position to supply fluid under pressure to the first of said circuits, then to the second of said circuits and while moving in the same direction, back to the first of said circuits, means responsive to the speed of the propeller for actuating said valve, and manually operable means for selectively preventing the movement of said valve to the third position or for moving it to the third position manually independently of said speed responsive means.

5. For use in operating a variable pitch propeller comprising a hub having axially rotatable blades thereon the mechanism comprising, fluid pressure motor means for rotating the blades about their axes, fluid circuits for said motor means, one of said circuits being effective for operating the motor means toward an increased pitch and full-feathered position and the other of said circuits being effective for moving the motor means toward a minimum pitch position, a common source of fluid pressure for both of said circuits, a selector valve for controlling the flow of pressure from said common source to said circuits, speed-responsive means connected with the valve for operating the same, and means for varying the effective coupling between the speed-responsive means and the valve to adjust the speed at which full feathering occurs.

6. For use with a variable pitch propeller comprising a hub having axially rotatable blades thereon, the invention comprising a fluid pressure motor means for rotating the blades about their axes, fluid circuits for said motor means, one of said circuits being effective for operating the motor means toward an increased pitch and full-feathered position and the other of said circuits being effective for moving the motor means toward a minimum pitch position, a common source of fluid pressure for both of said circuits, a selector valve for controlling the flow of pressure from said common source to said circuits, a governor driven with the propeller, an adjustable connection between the governor and the valve, and means operable while the governor is operating for lengthening or shortening said connection, whereby the speed at which full feathering occurs may be increased or decreased.

7. The combination with a engine driven variable pitch propeller having angular adjustable blades movable through a variable pitch range and also movable to a full-feathered position and having motor means for moving the blades, of speed-responsive means for controlling the operation of the first means, a throttle for controlling the speed of the engine which drives the propeller and means including a connection with the throttle for limiting the range of movement of the speed-responsive means to prevent full-feathering until the throttle has been opened to a predetermined position.

8. The combination with a variable pitch propeller having angularly adjustable blades movable through a variable pitch range and movable to a full-feathered position and having motor means for so moving the blades, of an engine throttle for controlling the speed of the propeller, means driven by the propeller for controlling the operation of said motor means, and limiting means connected with the throttle for restricting the range of movement of said first means until the throttle has been advanced to a predetermined position whereby the speed-responsive means is rendered ineffective to full-feather the blades until the throttle has been advanced past said predetermined position.

9. A variable pitch propeller mechanism comprising a hub having axially rotatable blades thereon movable through a variable pitch range and movable to a full-feathered position, fluid pressure motor means for rotating the blades about their axes in the variable pitch range and also to the full-feathered position, fluid pressure circuits for said motor means, said fluid pressure circuits comprising a circuit for operating the motor means to increase the pitch and full-feather the blades and a second circuit for operating the motor means to a low pitch position, a common source of fluid pressure for both of said circuits, a selector valve for controlling the flow of pressure from said source to said circuits, and means responsive to the speed of the propeller for operating the valve said valve being progressively movable from a position to supply fluid under pressure to the first of said circuits, then to the second of said circuits and then while moving in the same direction, back to the first of said circuits, an engine throttle mechanism for controlling the speed of said propeller, and means connected with said throttle mechanism for preventing movement of the selector valve to the third of said positions in the low speed positions of said throttle.

10. The combination with a variable pitch propeller having blades movable through a variable pitch range and movable to a full-feathered position, of motor means for actuating the blades, speed-responsive means for governing the motor means and arranged to effect automatic full-feathering of the blades upon a predetermined drop in the speed of the propeller, and manually adjustable means for changing the speed at which the speed-responsive means is effective to accomplish full-feathering.

11. The combination with a variable pitch propeller having blades movable through a variable pitch range and movable to a full-feathered position, of motor means for actuating the blades, speed-responsive means for governing the motor means and arranged to effect automatic full-feathering of the blades upon a predetermined drop in the speed of the propeller, manually adjustable means for changing the speed at which the speed-responsive means is effective to accomplish full-feathering, and a remotely located operating means for effecting said change.

12. A variable pitch propeller comprising a hub with axailly rotatable blades thereon, fluid pressure motor means for varying the pitch of the blades, a fluid pressure circuit for operating the motor means to move the blades in one direction, a blade-locking means which is biased to move to a blade-locking position, a fluid pressure means in said circuit for opposing movement of the locking means to locking position when there is a pressure in said circuit for actuating the motor means but which is ineffective when the pressure in said circuit drops below a predetermined point, there also being a second circuit for operating the motor in the other direction, and fluid pressure means in said second circuit for also opposing movement of the locking means to locking position whereby said locking means may operate only when both of said circuits are non-pressure circuits.

13. A variable pitch propeller comprising a hub with axially rotatable blades thereon, each of said blades having a pinion gear thereon through which it may be rotated, motor means on the hub engaging the pinion gears of the several blades for operating the blades, a fluid pressure circuit for driving the motor means in one direction, a fluid pressure circuit for driving the motor means in the other direction, a selector valve for controlling the flow of pressure to both of said circuits, an axially movable locking member on said hub having locking means adapted to be moved into and out of engagement with said pinion gears, springs for moving the locking means into a locking position, and separate fluid pressure cylinders in each of said two circuits for moving the locking means out of locking position.

14. A variable pitch and full-feathering propeller having axially rotatable blades, means for automatically varying the pitch of the propeller with a change of speed of the propeller, automatic means responsive to propeller speed for full-feathering the propeller, selectively operable means for manually full-feathering the propeller, and selectively operable means for rendering the automatic full-feathering means inoperable.

15. A variable pitch and full-feathering propeller having axially rotatable blades, means for automatically varying the pitch of the propeller with a change of speed of the propeller, automatic means for full-feathering the propeller, selectively operable means for manually full-feathering the propeller, selectively operable means for rendering the automatic full-feathering means inoperable, and a common control lever for both of said last-named means which has a neutral position in which the automatic means for full-feathering the propeller is effective and which has two other positions in addition to the neutral position for effecting manual full-feathering or for rendering the automatic full-feathering means inoperable.

16. A variable pitch propeller having axially rotatable blades, and fluid pressure motor means comprising a chamber having a movable element therein, said movable element having a part within the chamber responsive to differential pressures on opposite sides thereof and a part which is operatively connected with the blades, and fluid ports near opposite ends of the range of travel of said movable element through which fluid may enter or leave the chamber, and a by-pass leading from said chamber in advance of each port whereby fluid entering one of said ports may escape through one of the by-passes after effecting a predetermined travel of said movable element, the part of the movable element within the chamber serving to control circulation through said ports.

17. A variable pitch propeller having axially rotatable blades, fluid pressure motor means comprising a chamber having a movable element therein, said movable element having a part within the chamber responsive to differential pressures on opposite sides thereof and a part which is operatively connected with the blades and fluid ports near opposite end of the range of travel of said movable element through which fluid may enter or leave the chamber, a by-pass leading from said chamber in advance of each port whereby fluid entering one of said ports may escape through one of the by-passes after effecting a predetermined travel of said movable element, the part of the movable element within the chamber serving to control the circulation through the ports and a manually controlled shut-off valve for one of said by-passes for driving the movable element beyond the position it may reach when the by-pass is open, such means being effective for reversing the pitch of the blades of a propeller.

18. A control mechanism for rotating the blades of a variable pitch full-feathering propeller comprising a double acting fluid pressure motor, a valve casing having a fluid pressure inlet port and two cooperating ports connected to conduct fluid to opposite sides of the fluid pressure motor, and a valve element movable progressively in one direction from a position where neither of said two ports is open to a second position where the second of said two ports is open to a third position where the first is open.

19. For use with a propeller comprising a hub with a plurality of axially rotatable blades thereon, the fluid pressure motor means for turning the blades comprising a member having a chamber therein and a vane element within the chamber, the chamber member and the vane element being relatively movable, fluid circuits leading into the chamber one at each side of the limits of movement of the vane, a selector for controlling the flow of fluid in said circuits, said motor means having by-pass ports so located that after relative movement between the vane and chamber of a predetermined magnitude has occurred, the fluid escapes from the chamber without accomplishing further relative movement, the vane serving in its motion to partially control the flow of fluid through the by-pass ports.

20. For use with a propeller comprising a hub with a plurality of axially rotatable blades thereon the herein described means for turning the blades, comprising a motor means having a member with a chamber therein and having a vane element in the chamber responsive to differential pressures on opposite sides thereof, said chamber member and vane element being relatively movable, fluid circuits leading into the chamber one at each side of the vane, a selector for controlling the flow of fluid in said circuits, said motor means having by-pass ports so located that after relative movement between the vane and chamber of a predetermined magnitude has occurred, the fluid escapes from the chamber without accomplishing further relative movement, the vane element controlling the flow of fluid through the by-pass ports blade-locking means on the propeller movable into and out of blade-locking position, and an actuating means in each fluid circuit for moving the locking means out of blade-locking position whereby as long as pressure in either circuit is effective to operate the motor means the blade-locking means is held out of locking position and whereby after said by-pass ports are opened to permit the free flow of fluid through both circuits, the blade-locking means may move into locking position.

21. An automatic variable pitch propeller having blades thereon rotatable about their axes, reversible pressure motor means on the propeller for rotating the blades through a predetermined pitch range, valve means mounted on the propeller for rotation therewith through which the motors may be operated in one direction beyond said predetermined pitch range to reverse the pitch of the blades, and means supported independently of and adjacent the propeller for operating said valve means.

22. A variable pitch propeller mechanism comprising a variable pitch propeller the blades of which are movable through an operating range to a full-feathered position, fluid pressure motor means for operating the blades, a selector valve for controlling the motor means, speed-responsive means for operating the valve, the valve having a body member with a port therein and a valve member movable across the port and means on one of said members for adjustably varying the timing of the opening and closing of the port by the valve member under the operation of the speed-responsive means to thereby vary the time at which full-feathering will occur in relation to a given constant speed of the propeller.

23. The combination with a variable pitch propeller having blades which are adjustable through an operating range and which are movable to a full-feathered position and fluid pressure motor means for turning the blades, of a fluid pressure control system for the motor means including two circuits one for increasing the pitch of the blades and full-feathering them and one for decreasing the pitch of the blades, a source of fluid pressure, and a selector valve for controlling the flow of fluid from the pressure source through said circuits, said selector valve comprising a reciprocable valve element and a chamber in which it moves, the chamber having two spaced ports one of which is connected to each of said fluid circuits and having an intermediate port connected with the source of high pressure fluid, said valve being movable from one extreme position where communication is established from a high pressure source to the pitch increasing port to a second position where both of said ports leading to the fluid circuits are closed to a third position where the port to the fluid decreasing circuit is in communication with the source of high pressure fluid to a fourth position at which the source of high pressure fluid communicates with the port to the pitch increasing circuit, speed-responsive means for moving the valve, other means for moving the valve comprising a movable member, the valve having an extension thereon for engagement with the movable member, throttle-controlled means for operating the movable member to hold the valve out of the fourth position, a fluid pressure actuated means for operating the movable member to operate it to the first of said positions and a second fluid pressure operated means for operating the movable member to hold the valve out of the fourth position, and a control element for selectively operating either one or the other of said last-named fluid pressure means for rendering them both inoperative.

24. A variable pitch propeller control valve assembly comprising a variable body having a reciprocable valve element therein which is movable from a neutral position in one direction to a pitch increasing position and in the other direction to a pitch decreasing position and upon further movement in the same direction to pitch increasing and full feathering position, speed-responsive means for operating the valve, and manually controlled means for operating the valve, said manually controlled means comprising a movable element adjacent the valve, the valve having an extension thereon for cooperation with the movable element, a throttle-controlled mechanism for operating the movable element, a fluid pressure controlled mechanism for operating the movable element, a second fluid pressure controlled mechanism for operating the movable element to a position different from the position it is operated to by the first, and a second valve movable from a position where neither of said fluid pressure mechanisms are operable selectively to a position where one of said fluid pressure control mechanisms is operable or to a position where the other of said fluid pressure control means is operable.

25. The combination with a variable reversible pitch propeller having axially rotatable blades, of motor means for operating the blades, means operable only when the propeller is revolving at a speed below a normal flying speed for causing the motor means to move the blades to a reverse pitch setting, and other means operable at any time for selectively pre-arranging for the change of pitch to occur when the speed is reduced below such minimum.

26. The combination with a variable reversible pitch propeller having axially rotatable blades, of motor means for operating the blades, means operable only when the propeller is revolving at a speed below a normal flying speed for causing the motor means to move the blades to a reverse pitch setting, said means including a manually set selector that may be moved at any time to prepare for reversing the blades in advance of the reversing movement taking place, and speed-responsive means driven with the propeller to accomplish the turning of the blades through said motor means when the speed of the propeller has dropped down to a predetermined maximum and after said manually set selector has been operated to prepare for reversing.

27. The combination with a propeller having axially rotatable blades and a driving means for the propeller, of reversible fluid motor means for turning the blades, said motor means being operable to reverse the pitch of the blades only when the blades are at a low forward pitch angle, and speed-controlled means driven by the propeller driving means to keep the blades above said low forward pitch position when the propeller is operating above a predetermined speed, and selectively operable means which may be set at any speed for causing operation of the motor means to reverse the pitch of the blades thereafter but only when the propeller has been slowed down below said predetermined speed of rotation.

28. For use in combination with a variable pitch propeller having angularly adjustable blades movable through a varying pitch range to a full-feathered position, the blade operating mechanism comprising a reversible fluid pressure motor means for turning the blades a valve for controlling the operation of the reversible fluid pressure motor and speed-responsive means operating the valve for controlling the motor means said valve having ports so arranged as to full-feather the blades when the engine is operating below a predetermined speed and to automatically restore the blades when the engine speed is again restored to such predetermined speed.

29. The combination with a variable pitch full-feathering propeller, of fluid pressure means for automatically full-feathering the propeller when the speed of the propeller drops below a predetermined minimum and for automatically unfeathering the blades when the speed of the propeller is restored above such minimum, and speed responsive means for controlling said fluid pressure means.

30. The combination with a variable full-feathering propeller, of fluid pressure means for automatically full-feathering the propeller when the speed of the propeller drops below a predetermined minimum and for automatically unfeathering the blades when the speed of the propeller is restored above such minimum, speed responsive means for controlling said fluid pressure means and manually controlled means selectively operable to render the speed-responsive means ineffective to full-feather the blades.

31. A variable pitch propeller having a plurality of blades, a fluid pressure motor system for operating the blades to change the pitch thereof, a speed responsive valve mechanism for controlling said fluid pressure system, manually controlled valve means in the system for causing the operation of the blades to a reverse pitch position, said manually controlled valve means and said speed responsive valve mechanism being connected into the system in a manner such that the operation of said manually controlled valve means is normally ineffective to reverse the blades until the speed responsive valve has been moved to a predetermined position.

32. A variable pitch propeller having a plurality of vanes movable through a variable pitch range to a full feather position and also to a reverse pitch position, a fluid pressure motor system for moving the vanes, a single valve unit through which all movements of the vanes are controlled, speed responsive means for normally operating the valve, and an auxiliary manually operated valve element in the fluid motor system through which said single valve is made effective to reverse the pitch of the blades.

33. A variable pitch propeller having a plurality of vanes movable through a variable pitch range to a full feather position and also to a reverse pitch position, a fluid pressure motor system for moving the vanes, a single valve unit through which all movements of the vanes are controlled, speed responsive means for normally operating said valve, and manually operated means for modifying the normal operation of said valve in response to the speed responsive mechanism whereby automatic full feathering may be avoided in idling the engine.

ARTHUR G. RINDFLEISCH.